United States Patent
Park et al.

(10) Patent No.: US 8,219,151 B2
(45) Date of Patent: Jul. 10, 2012

(54) PORTABLE TERMINAL AND DRIVING METHOD OF THE SAME

(75) Inventors: Hee Kyung Park, Seoul (KR); Jong Hwan Kim, Seoul (KR); Seon Hwi Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 12/403,138

(22) Filed: Mar. 12, 2009

(65) Prior Publication Data

US 2010/0004028 A1    Jan. 7, 2010

(30) Foreign Application Priority Data

Jul. 1, 2008    (KR) .................... 10-2008-0063458

(51) Int. Cl.
*H04M 1/00*    (2006.01)
*G06F 3/01*    (2006.01)
*G06F 3/041*   (2006.01)

(52) U.S. Cl. ........ 455/566; 455/567; 345/173; 345/169; 715/702

(58) Field of Classification Search .................. 455/566, 455/567; 345/173, 169; 340/407.1; 715/702, 715/701, 763
See application file for complete search history.

(56) References Cited

U.S. PATENT DOCUMENTS

| 7,890,863 | B2 * | 2/2011 | Grant et al. | 715/702 |
| 2002/0149561 | A1 * | 10/2002 | Fukumoto et al. | 345/156 |
| 2006/0199612 | A1 * | 9/2006 | Beyer et al. | 455/556.2 |

* cited by examiner

*Primary Examiner* — Daniel D Chang
(74) *Attorney, Agent, or Firm* — KED & Associates, LLP

(57) ABSTRACT

A portable terminal is provided that includes a vibration generator for vibrating the portable terminal, a receiving device for receiving input from a user and determining a coordinate value on a display screen based on the received input, and a controller for determining a vibration pattern corresponding to information on a display screen based on the determined coordinate value.

37 Claims, 33 Drawing Sheets

[Figure 1]
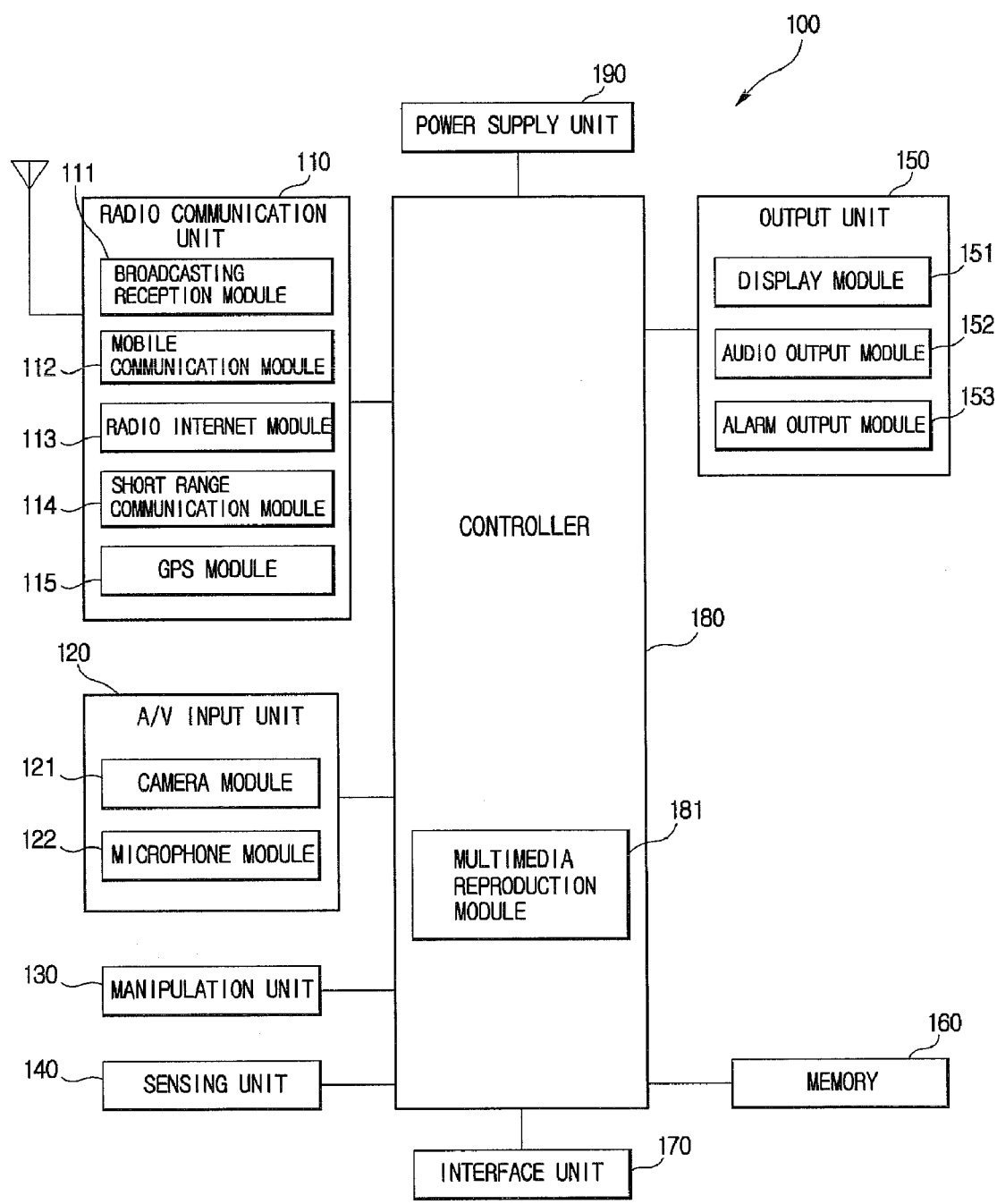

[Figure 2]
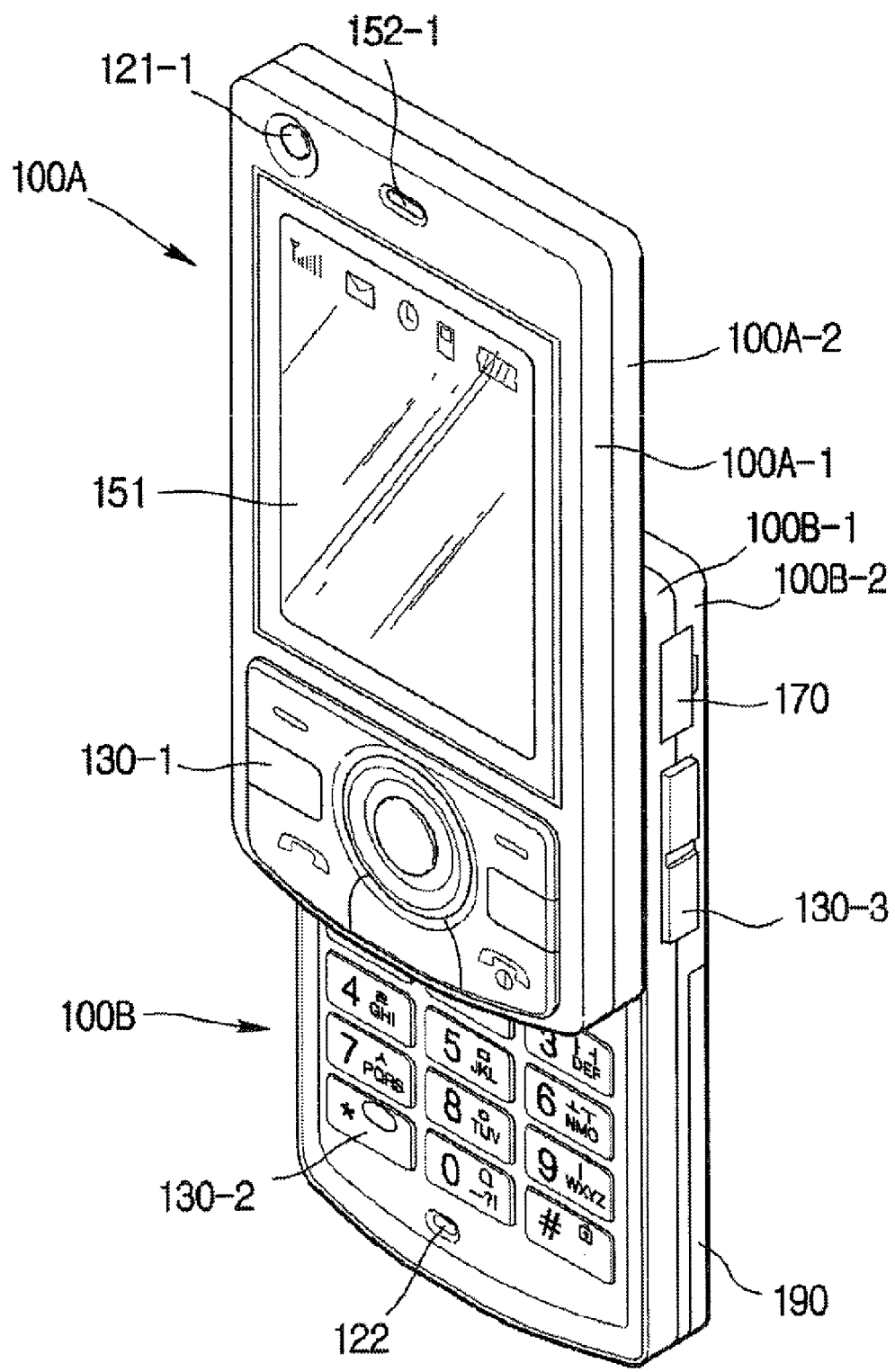

[Figure 3]
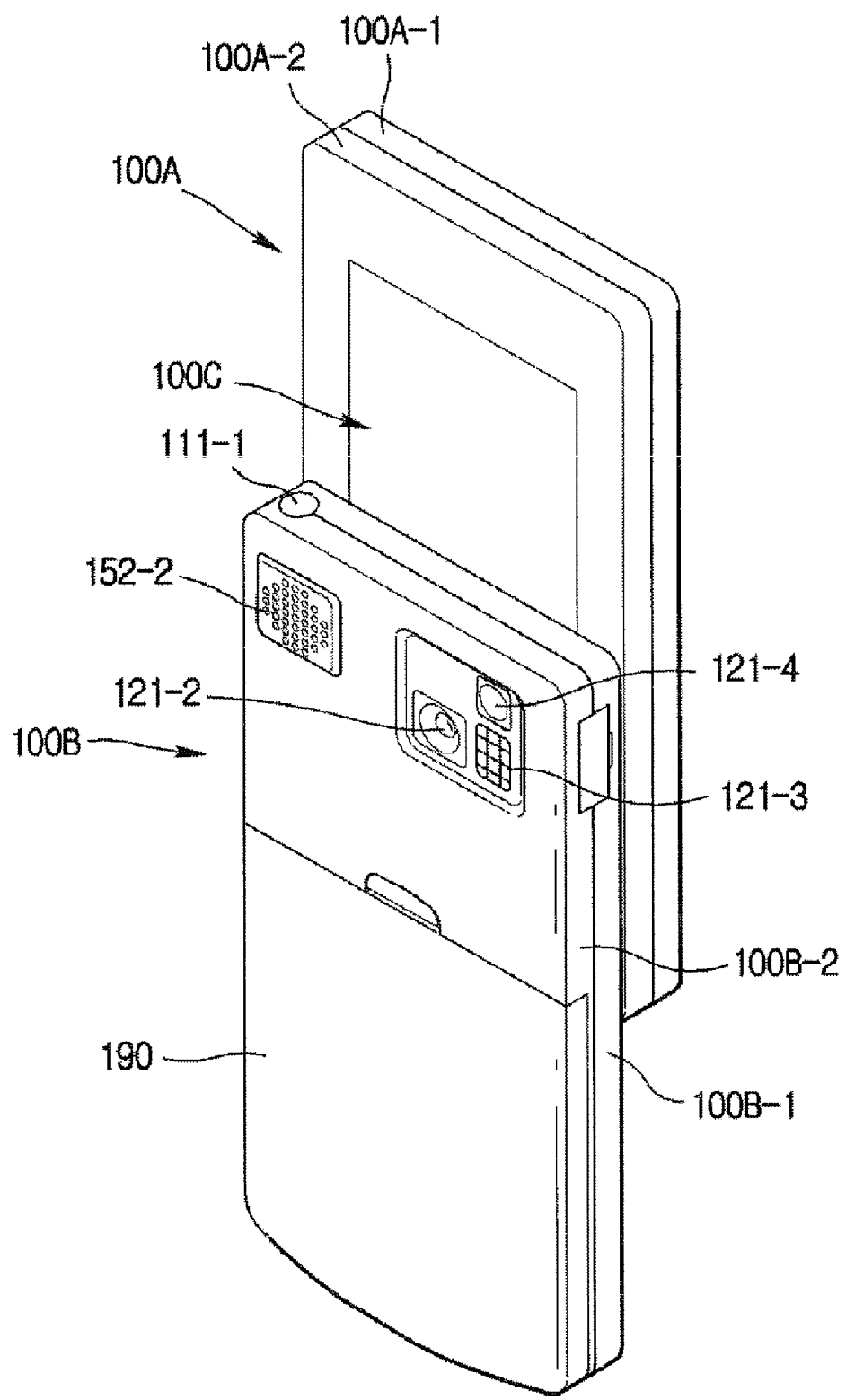

[Figure 4]
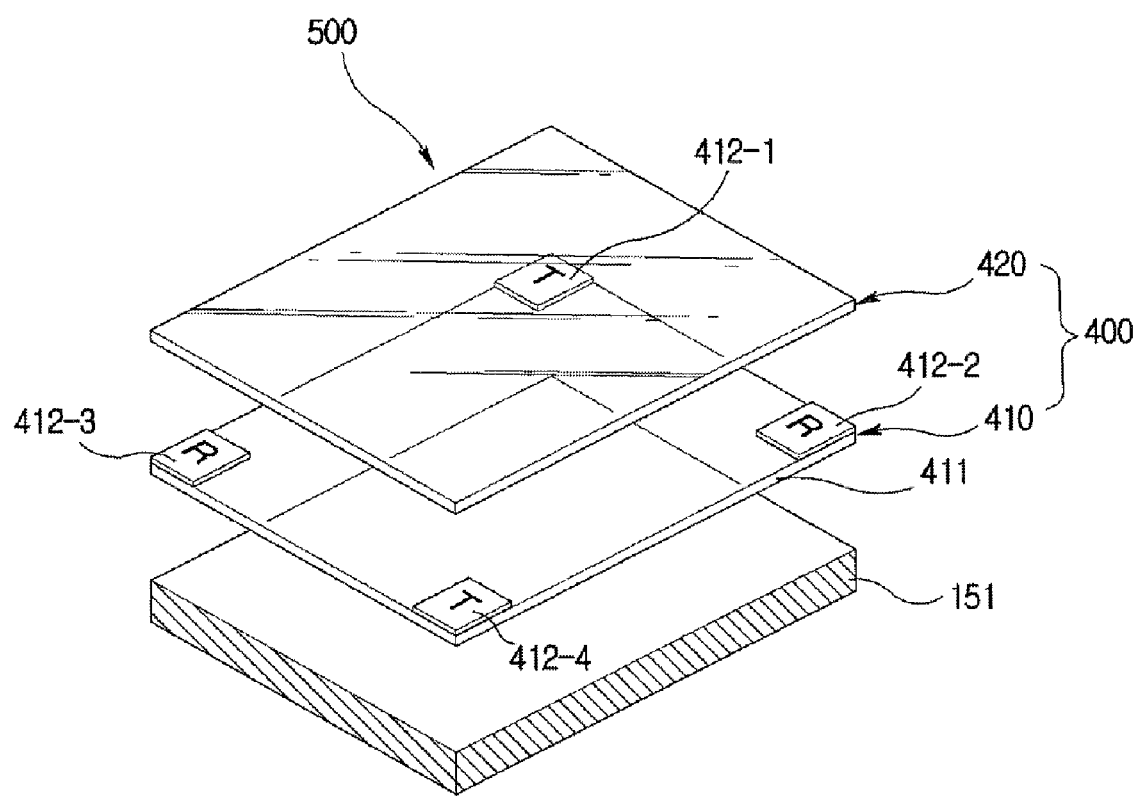

[Figure 5]
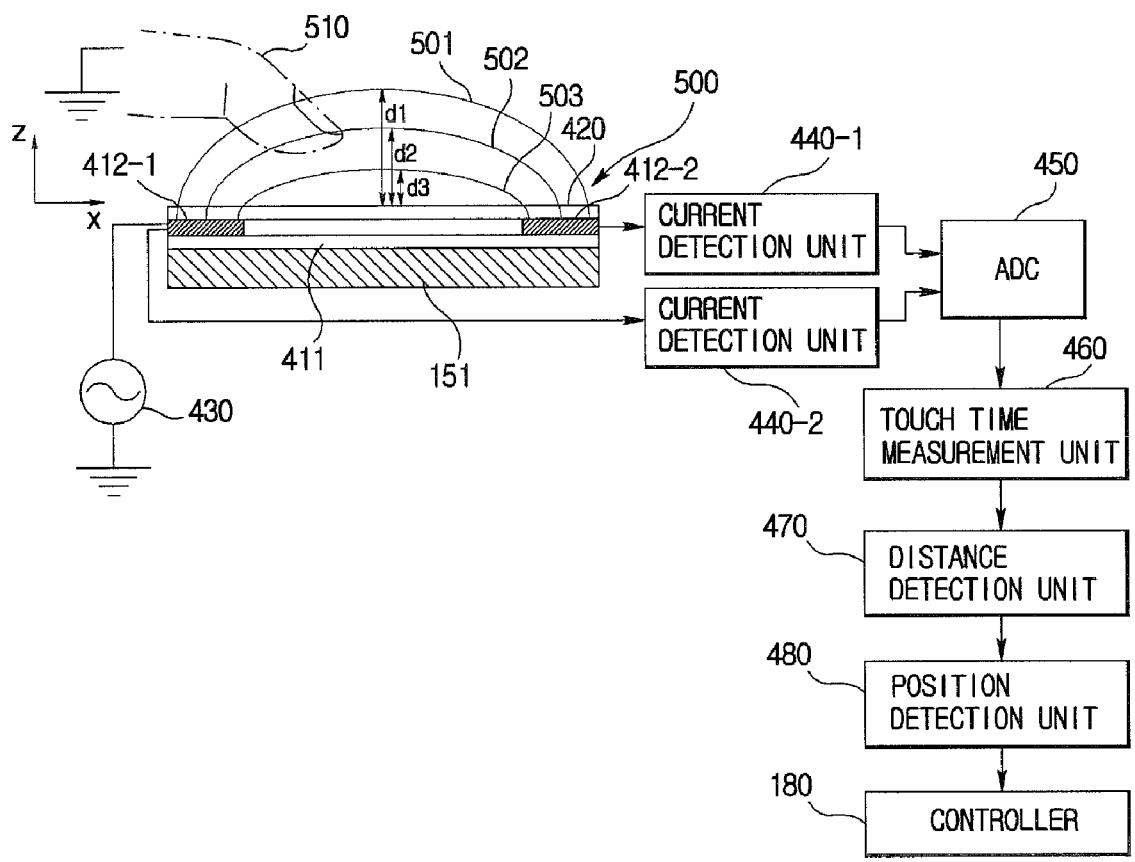

[Figure 6]
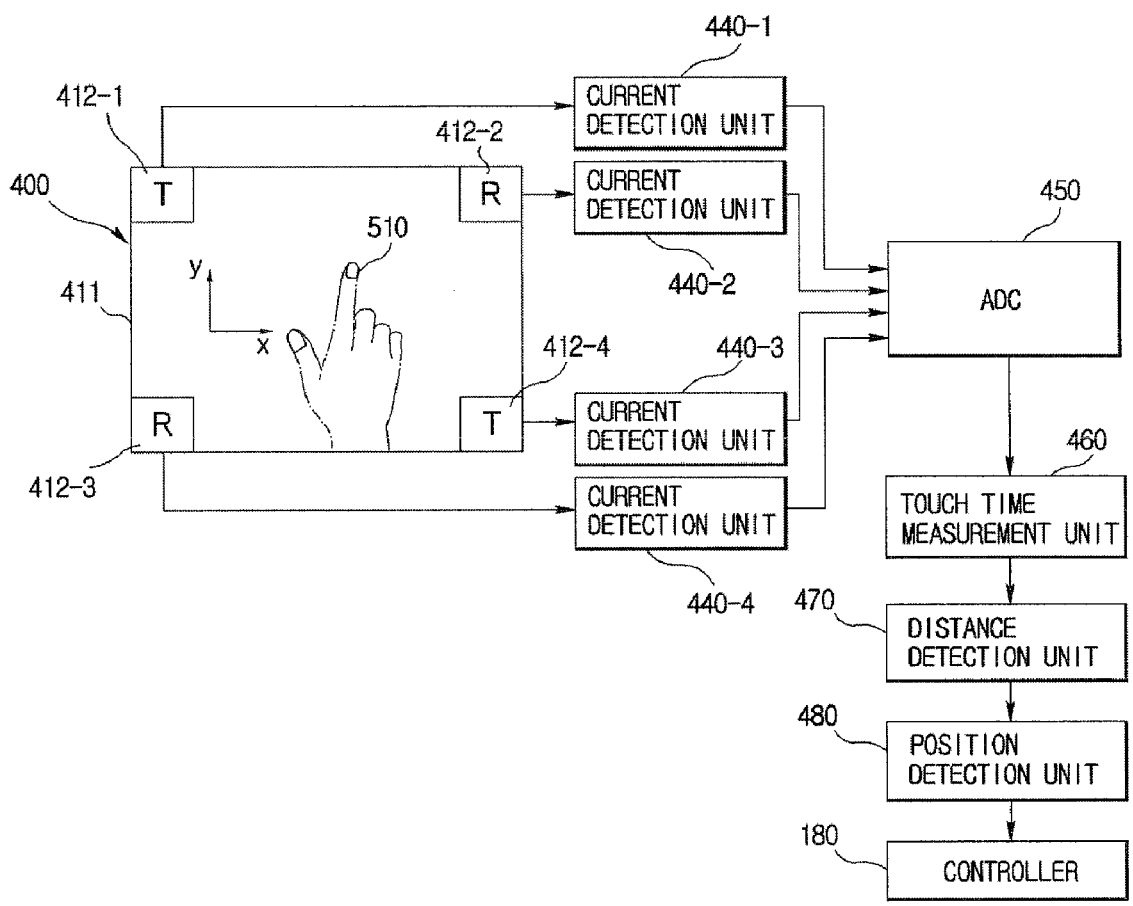

[Figure 7]
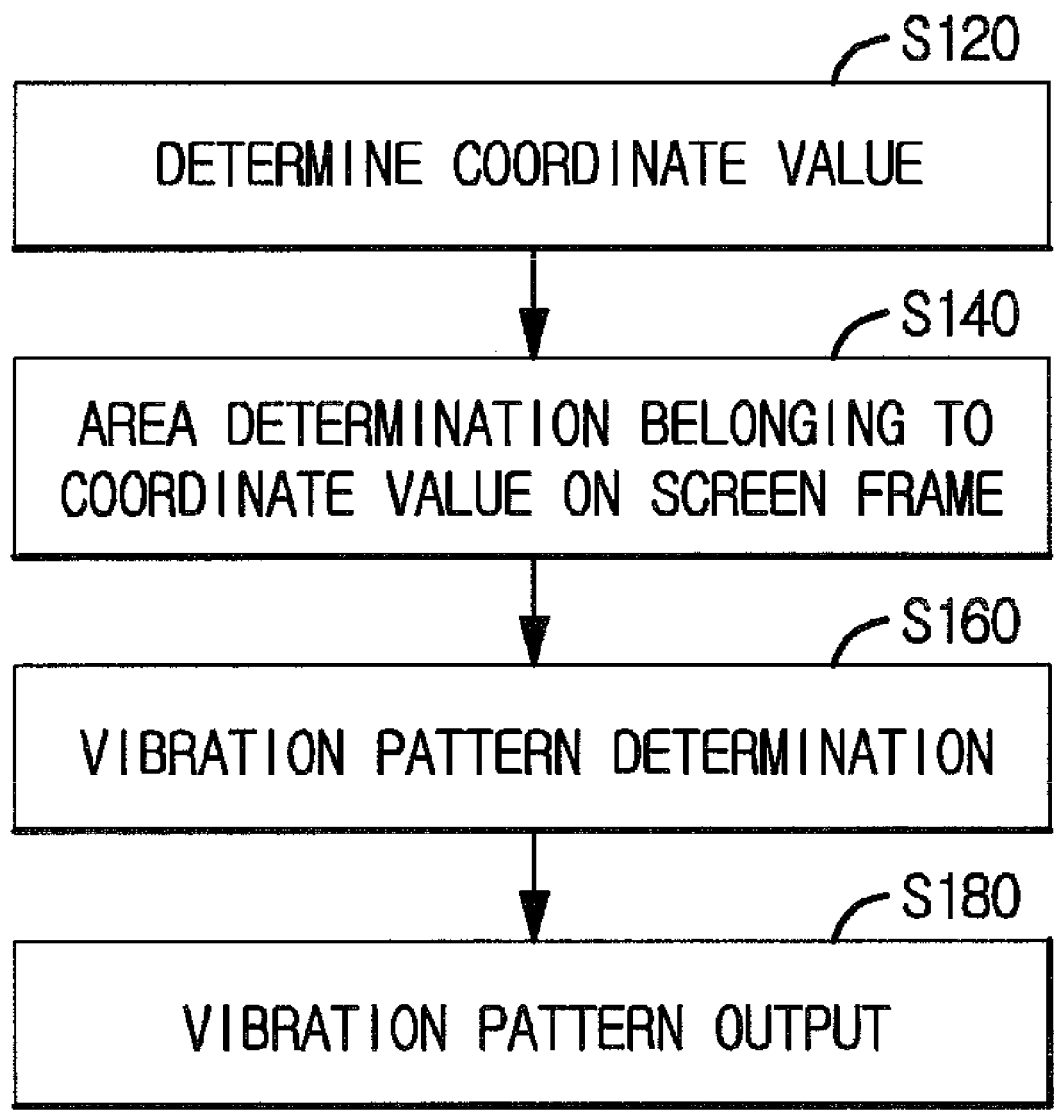

[Figure 8A]
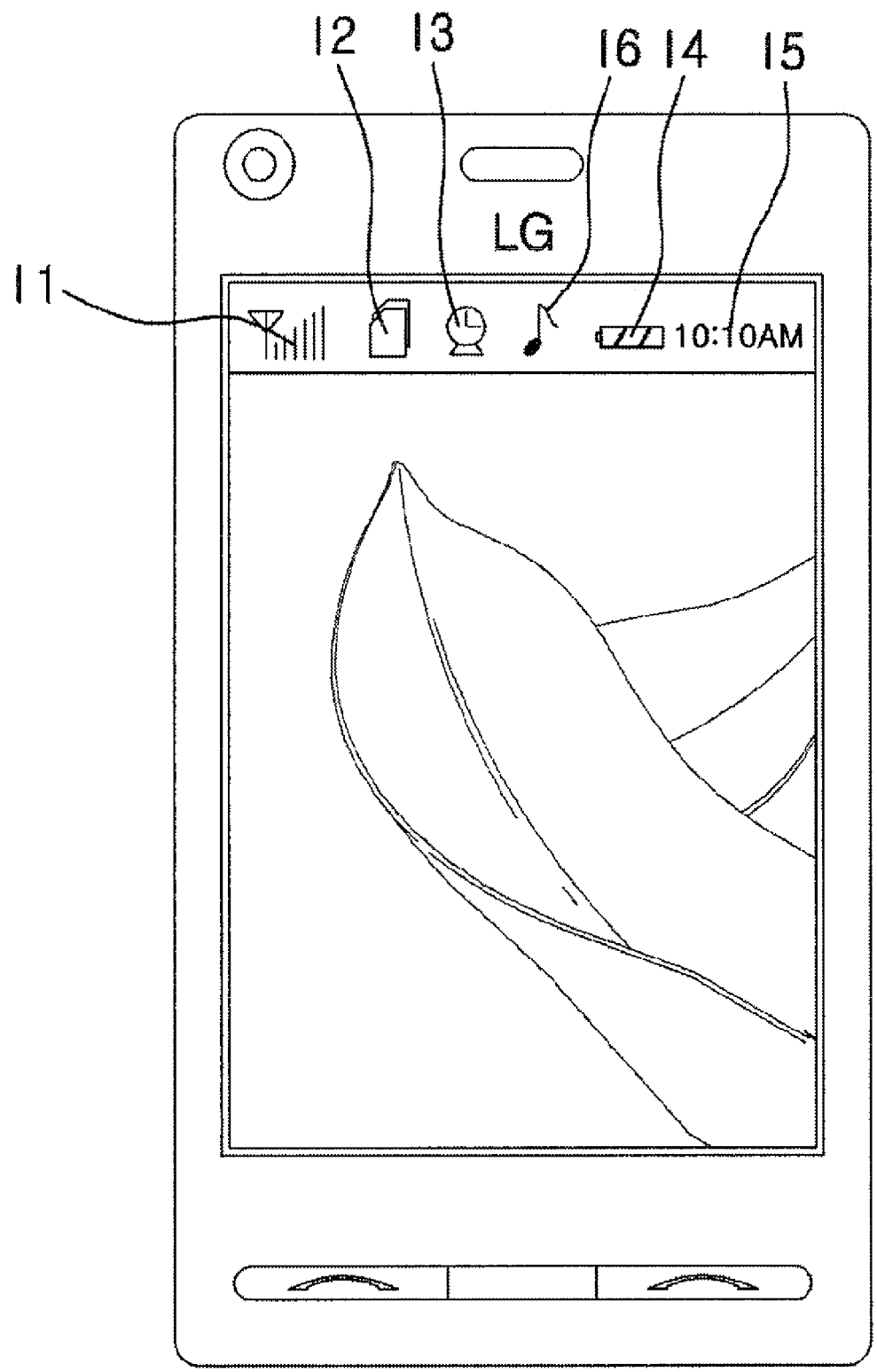

[Figure 8B]
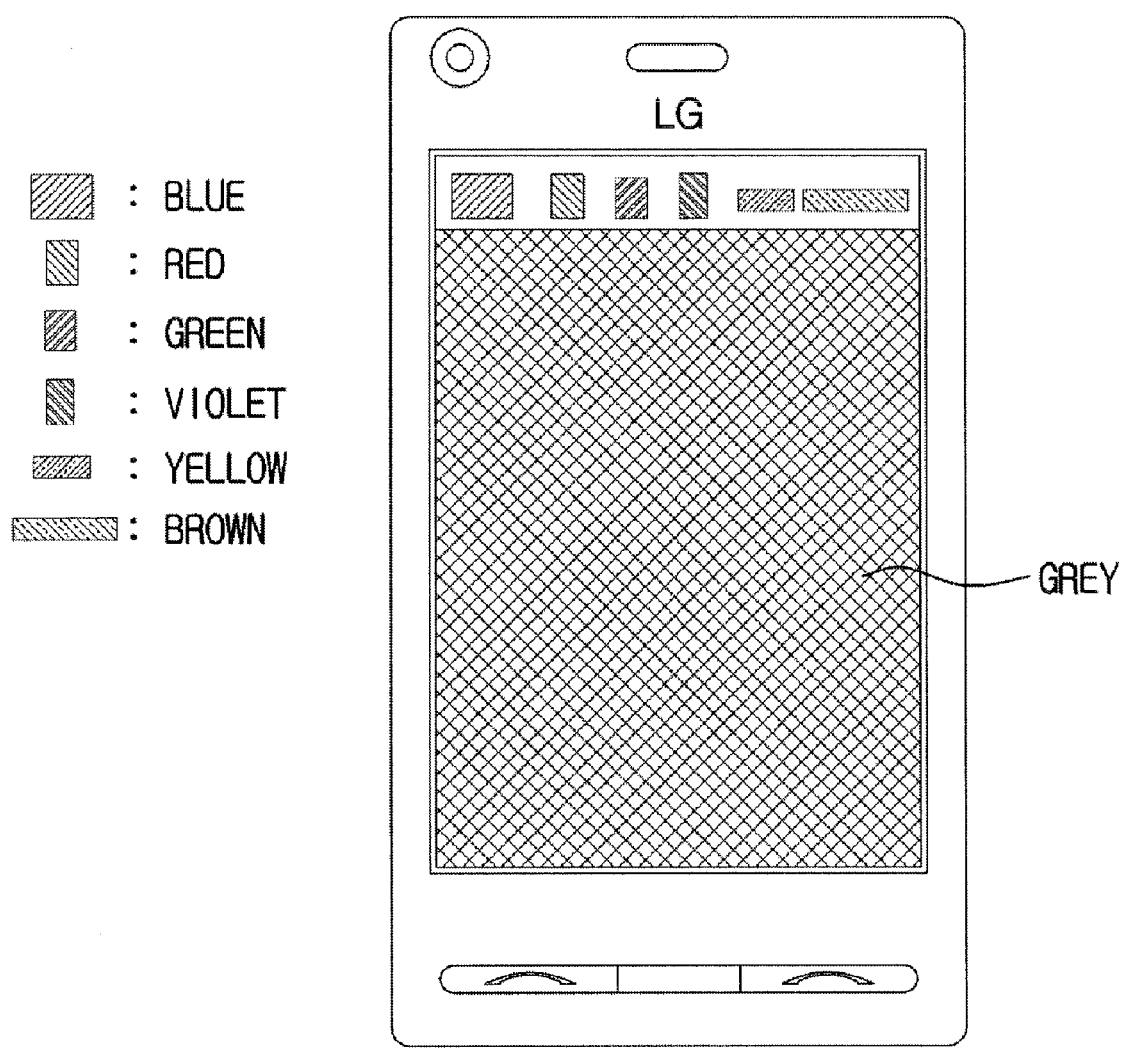

[Figure 9A]
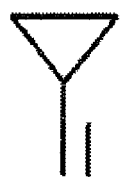 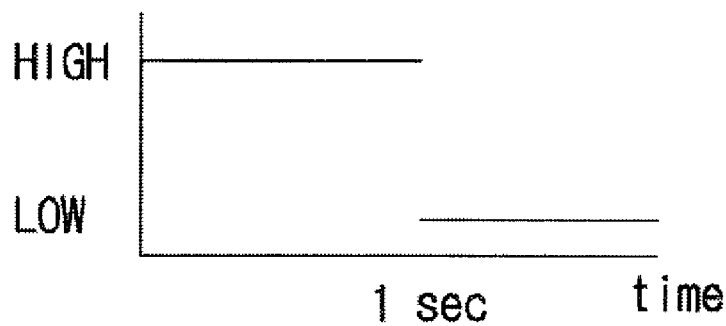
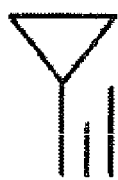 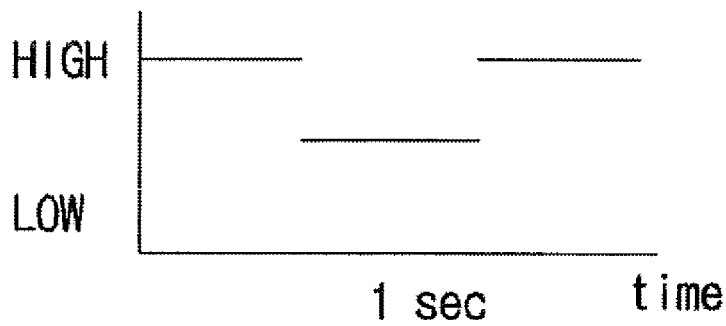
 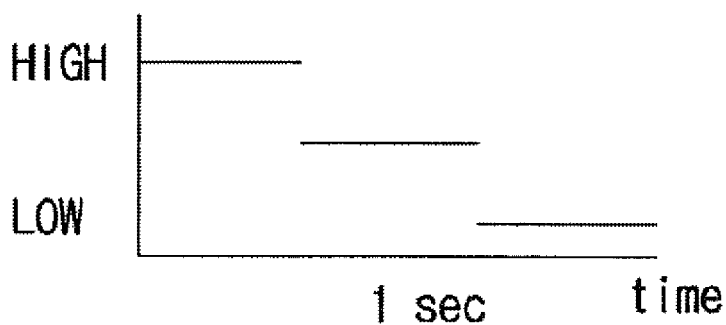
 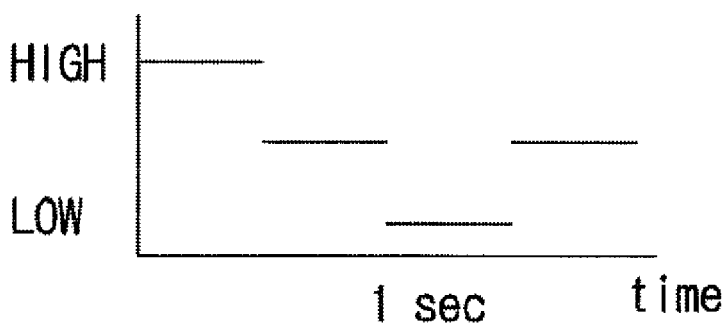

[Figure 9B]
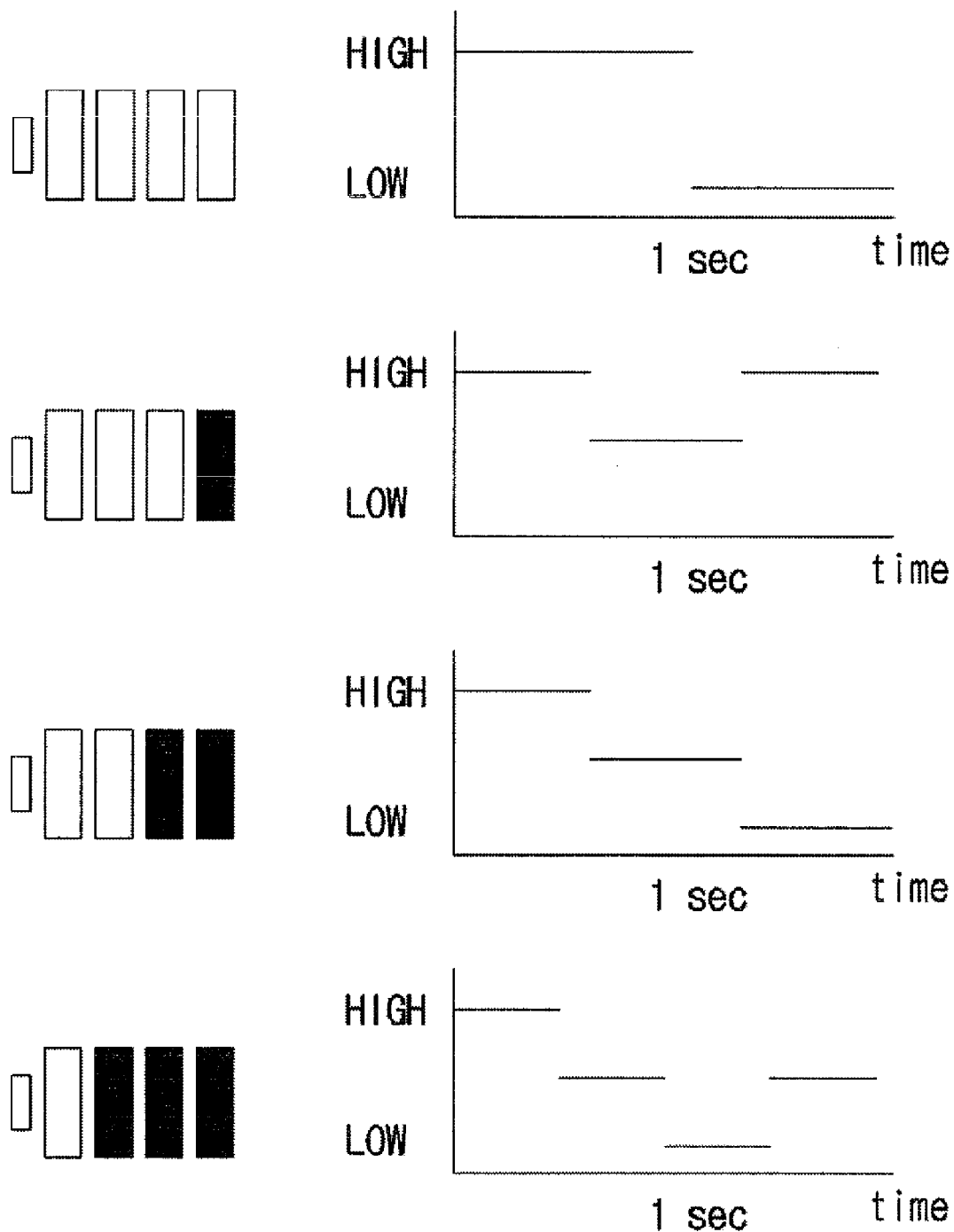

[Figure 10A]
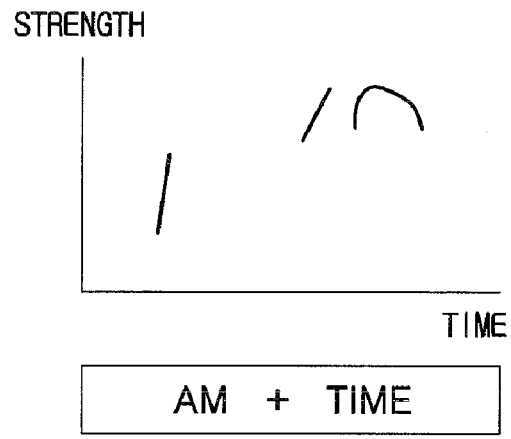
[Figure 10B]
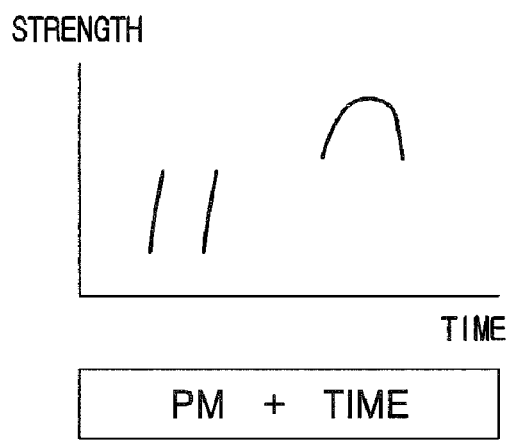

[Figure 10C]
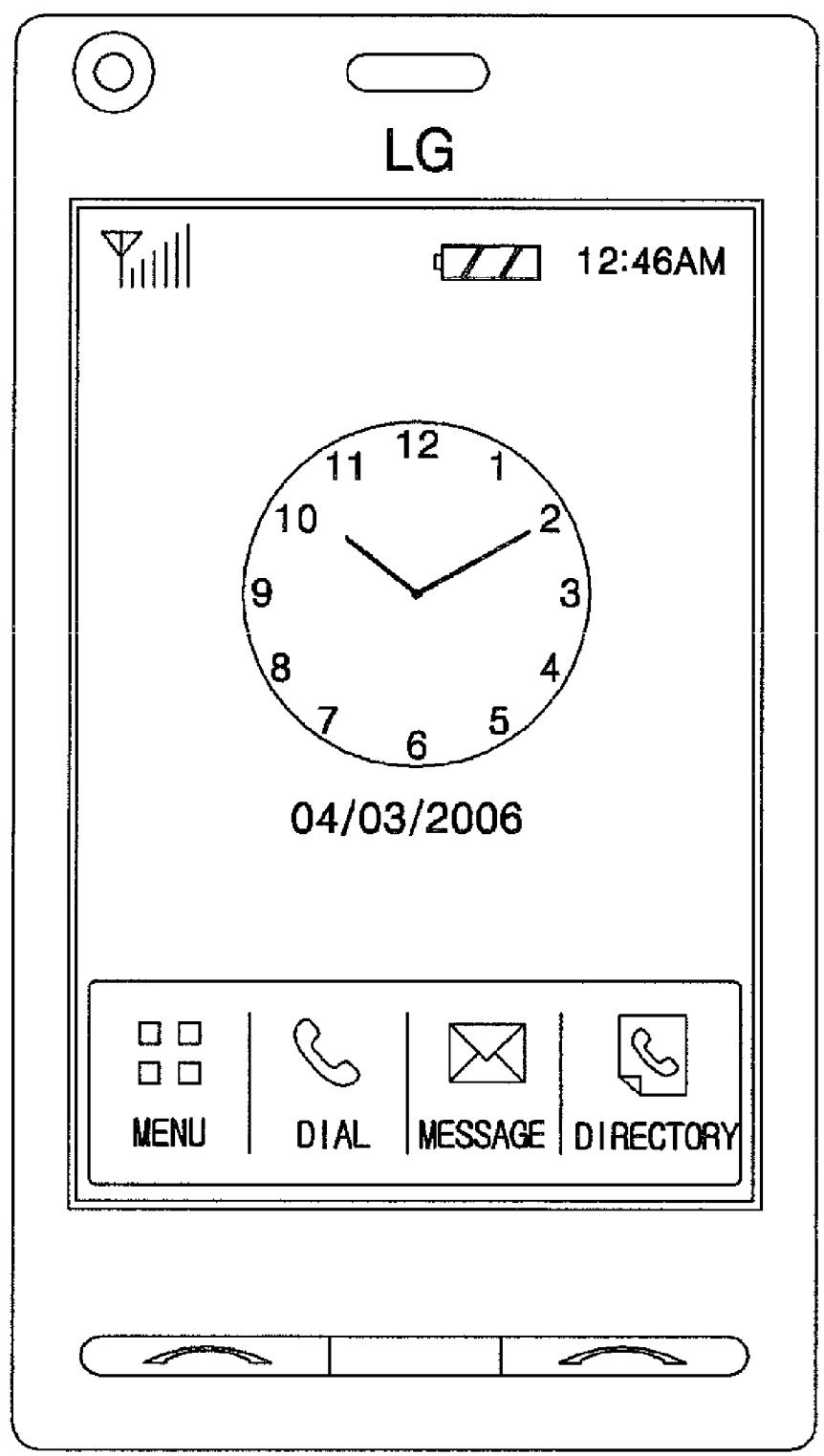

[Figure 11]
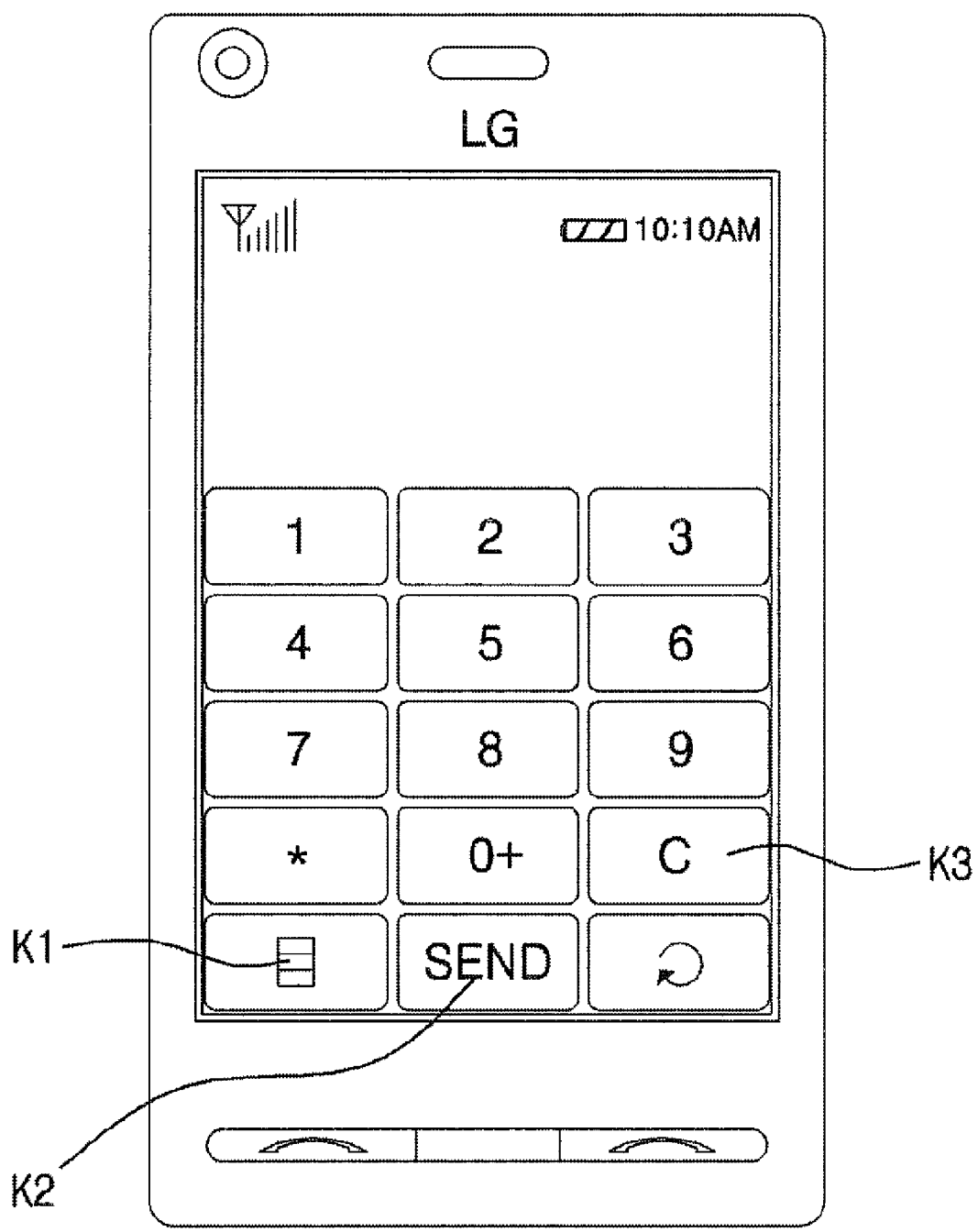

[Figure 12]
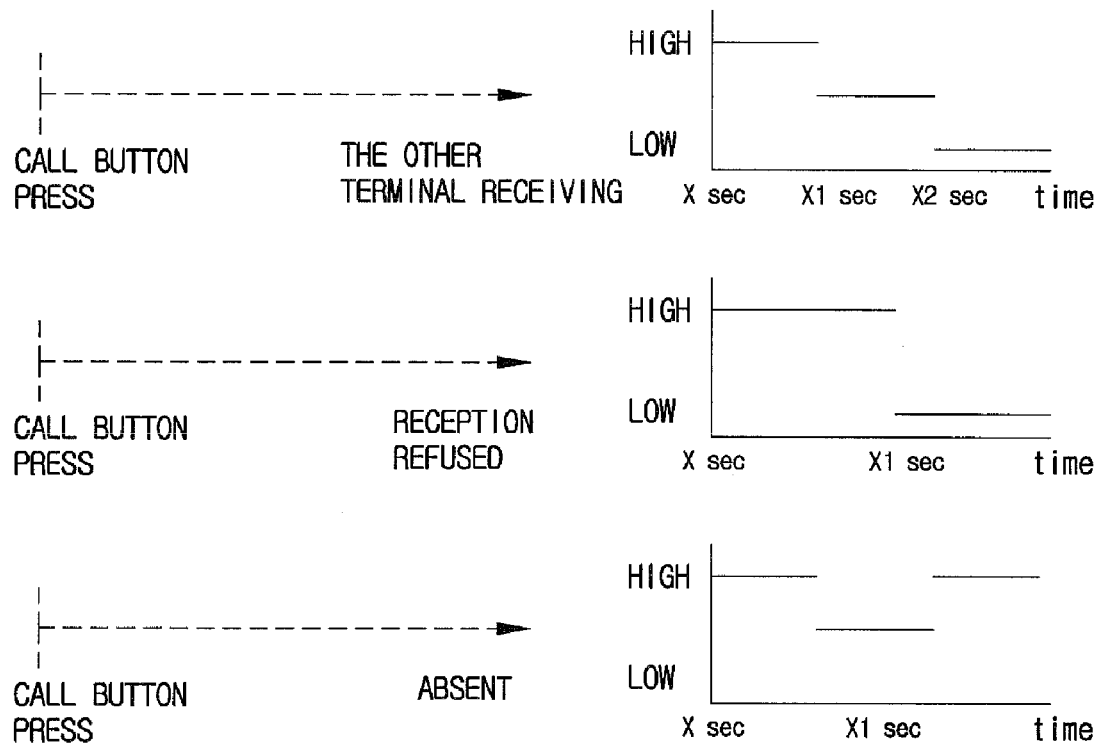

[Figure 13A]
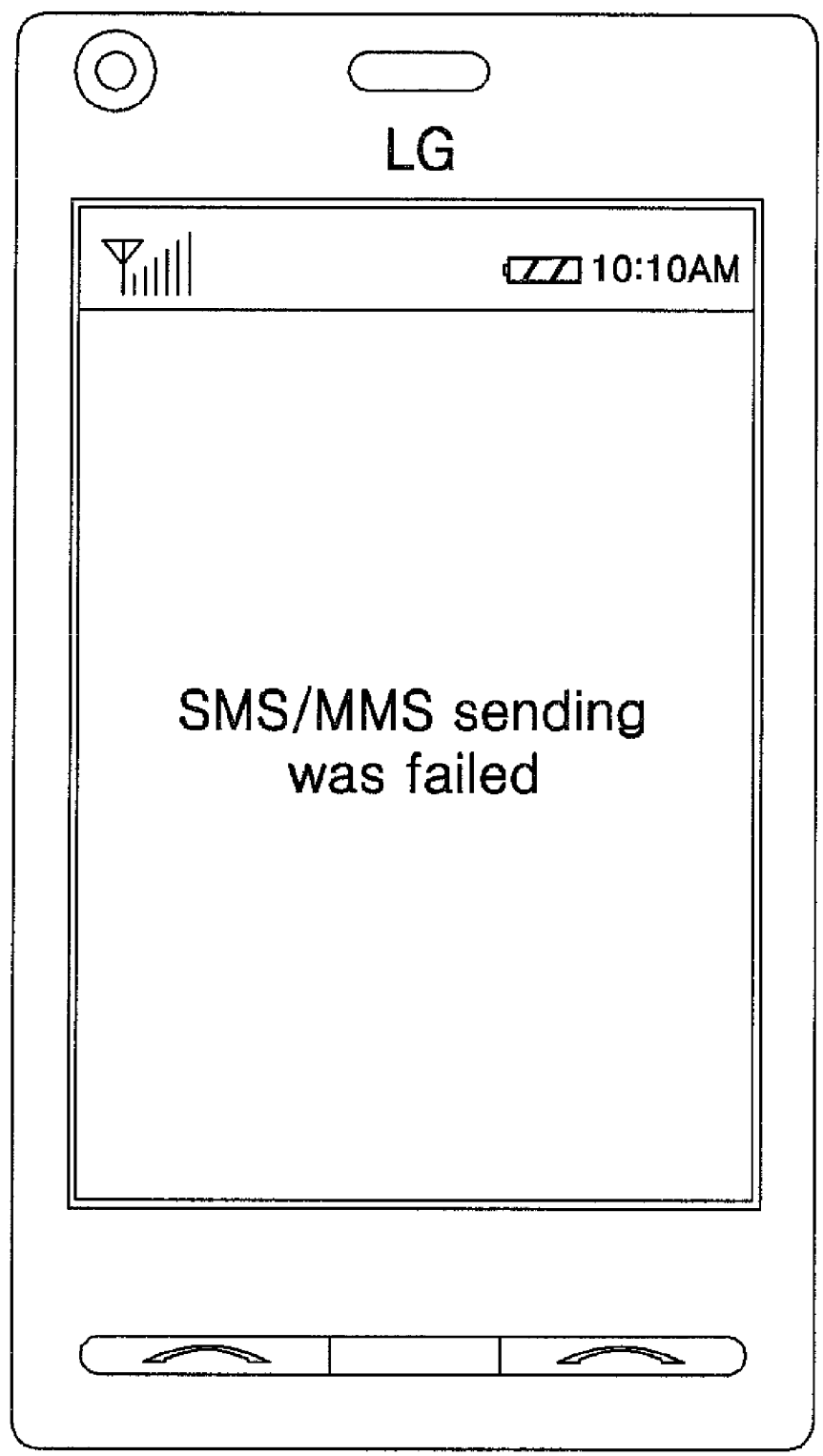

[Figure 13B]
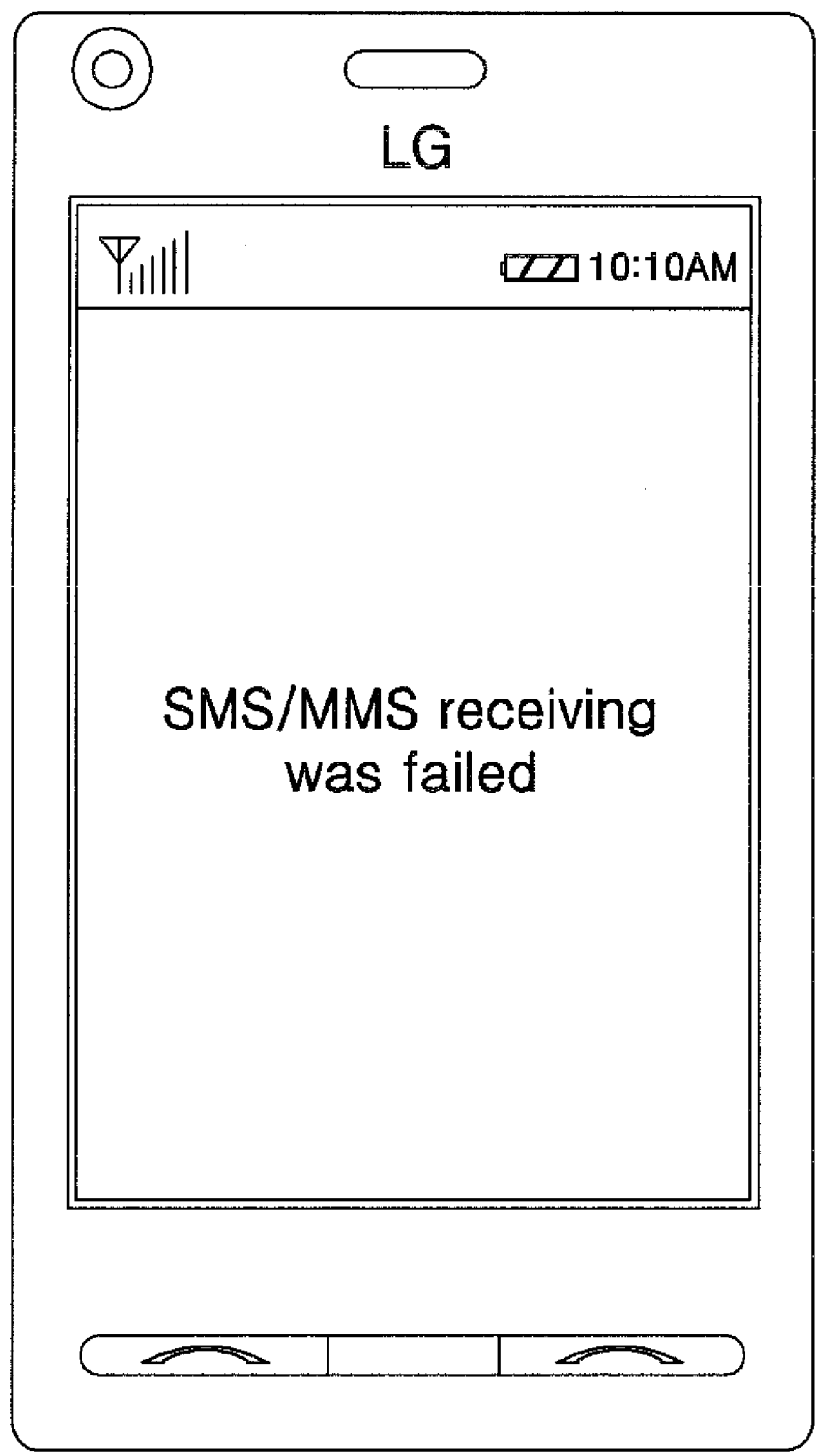

[Figure 13C]
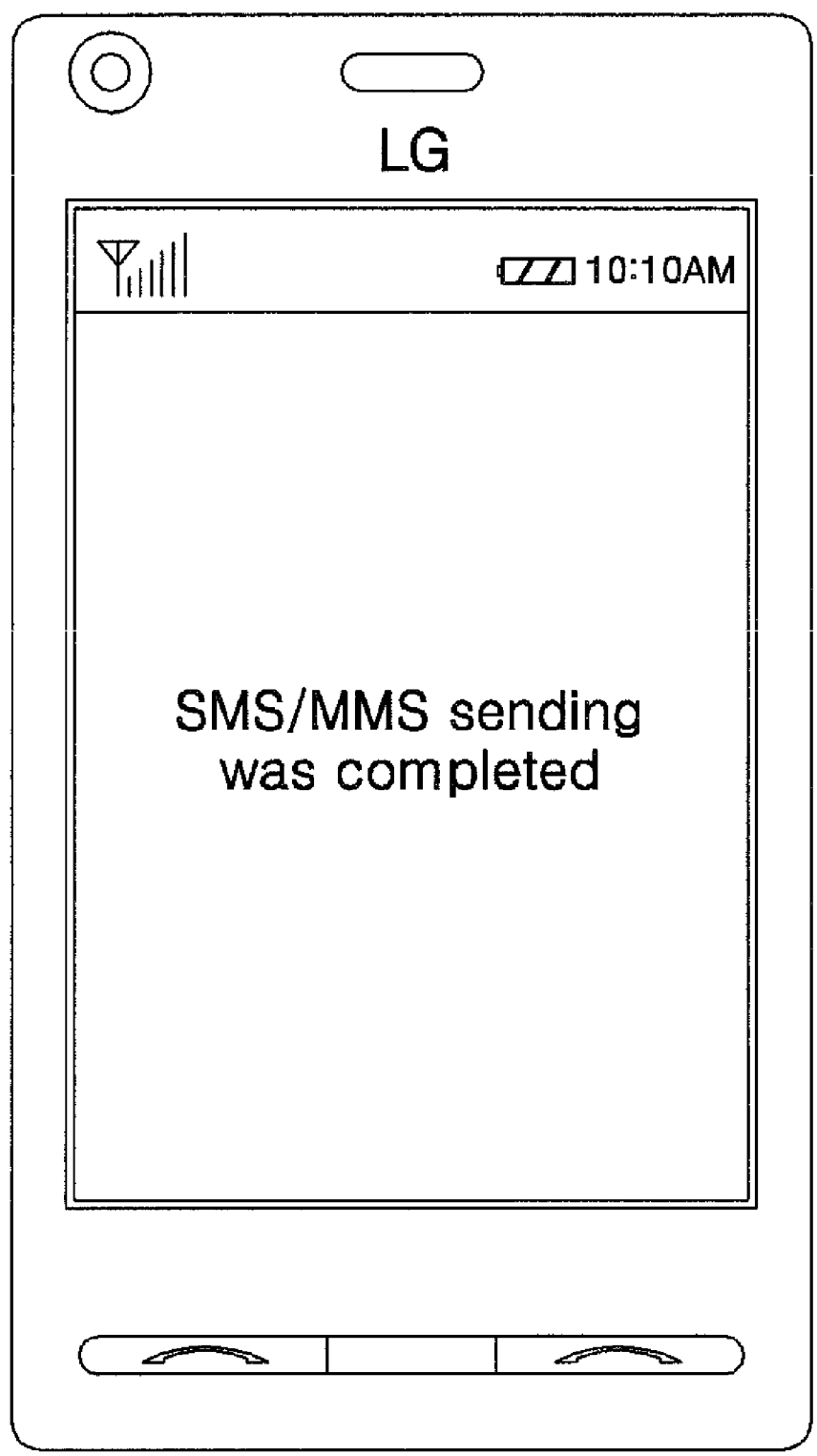

[Figure 13D]
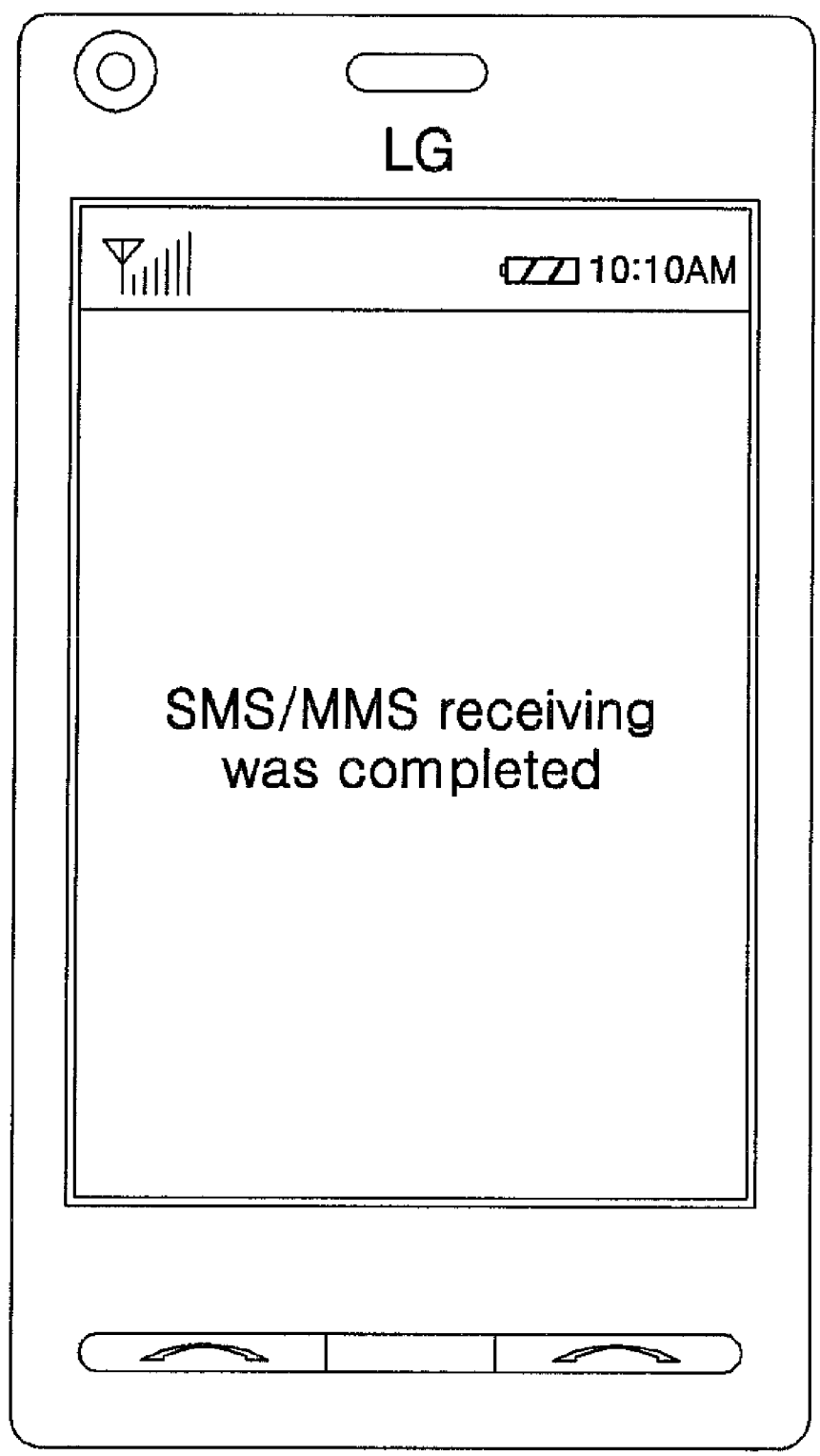

[Figure 14]
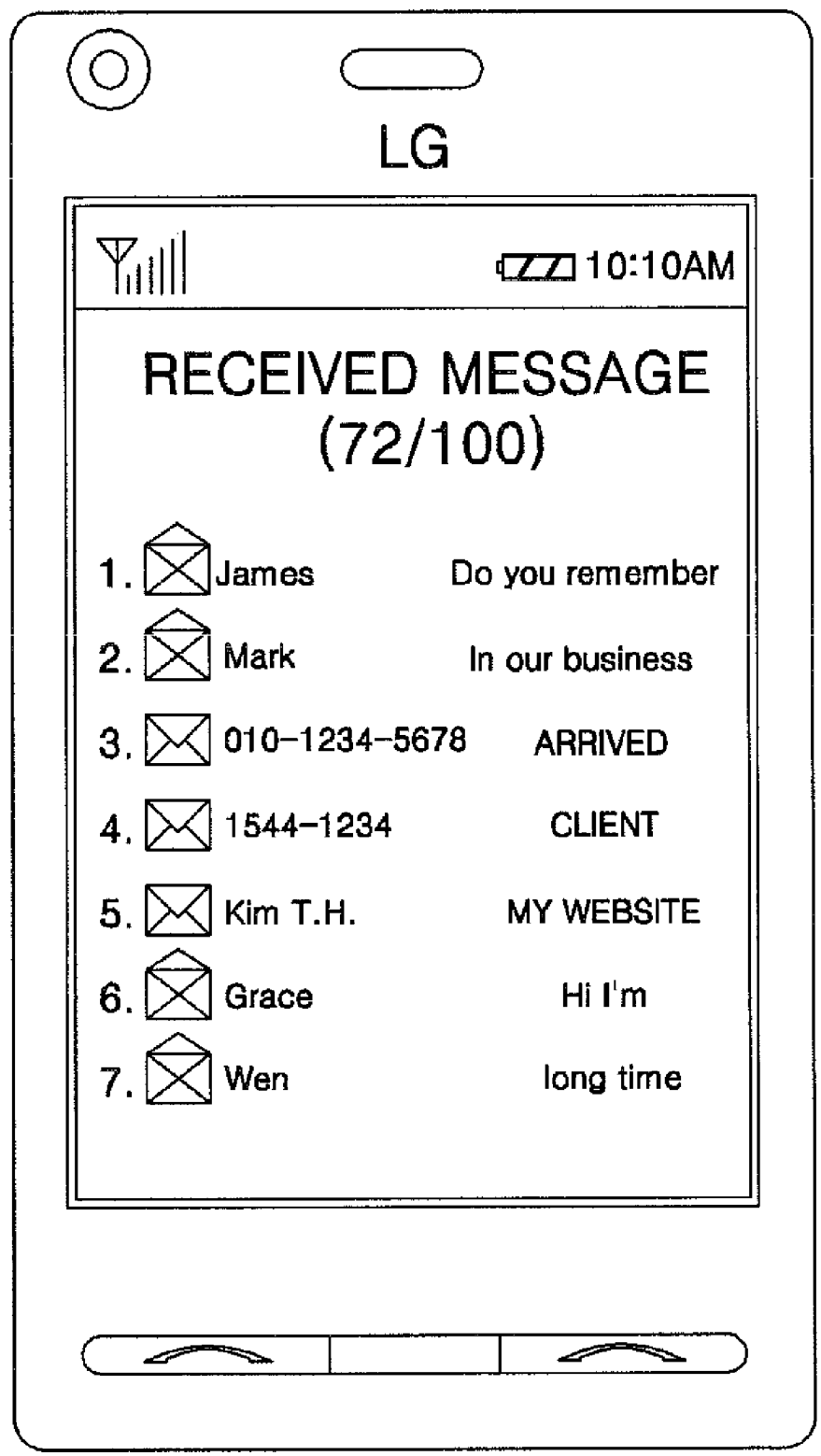

[Figure 15]
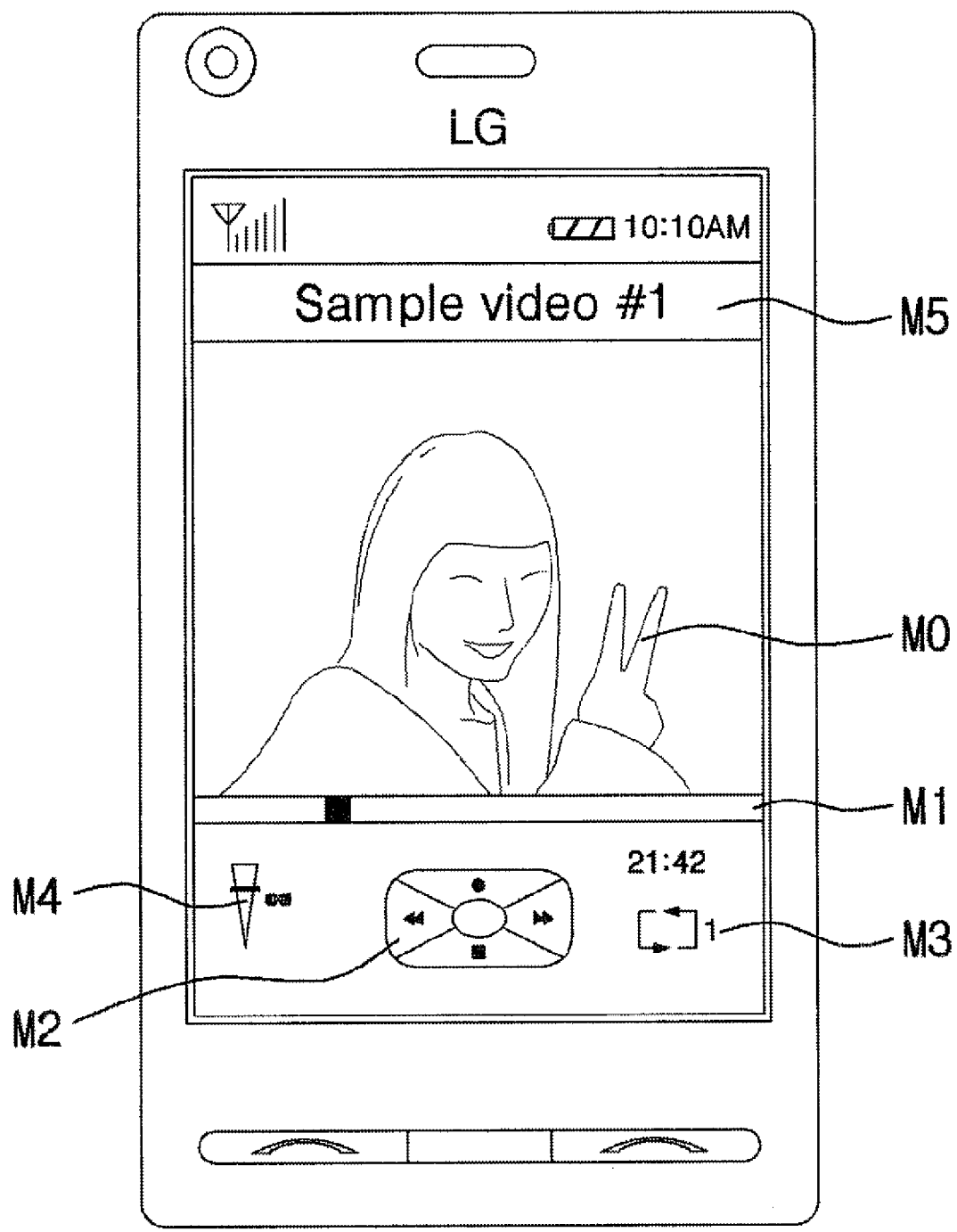

[Figure 16A]
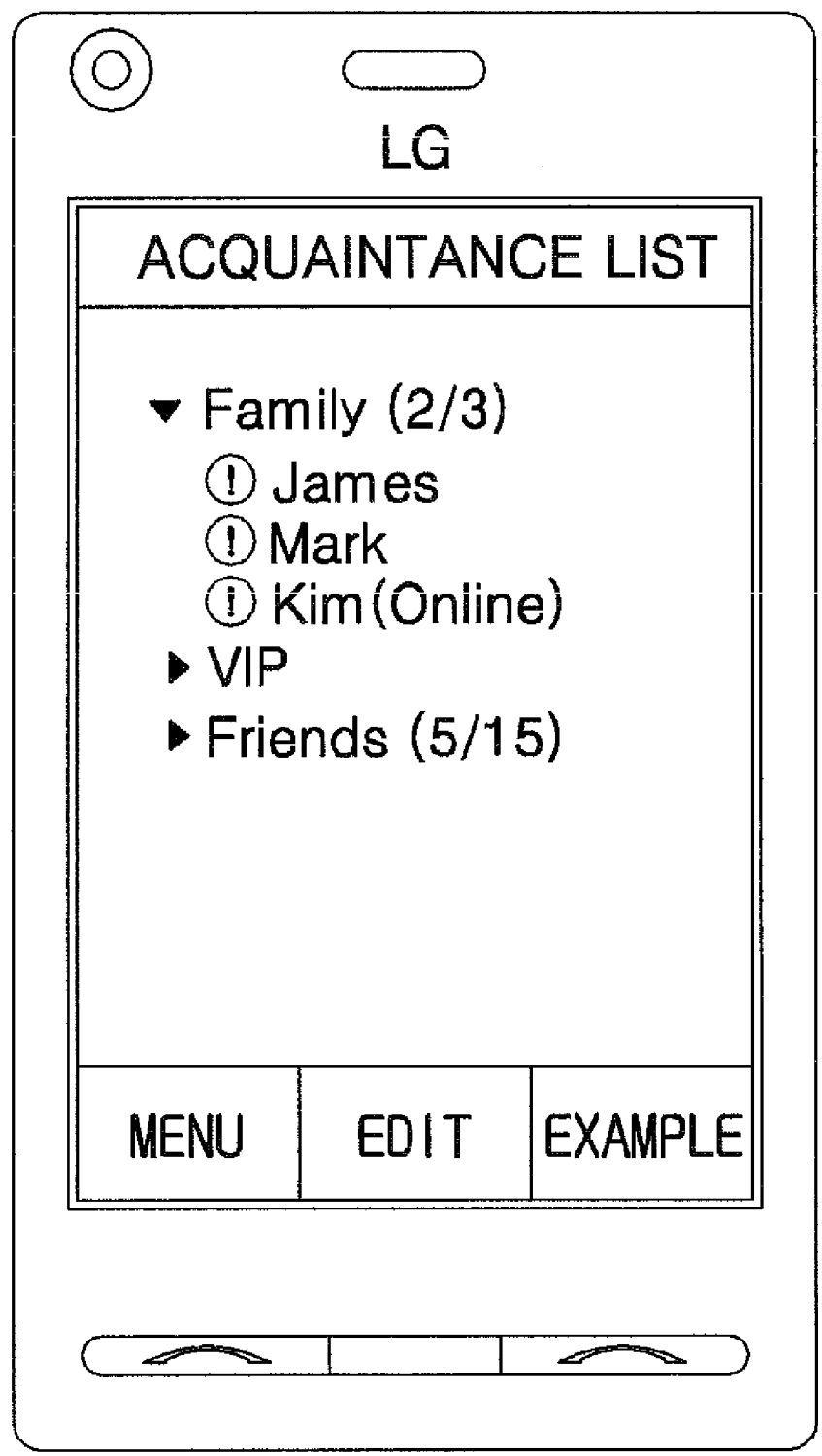

[Figure 16B]
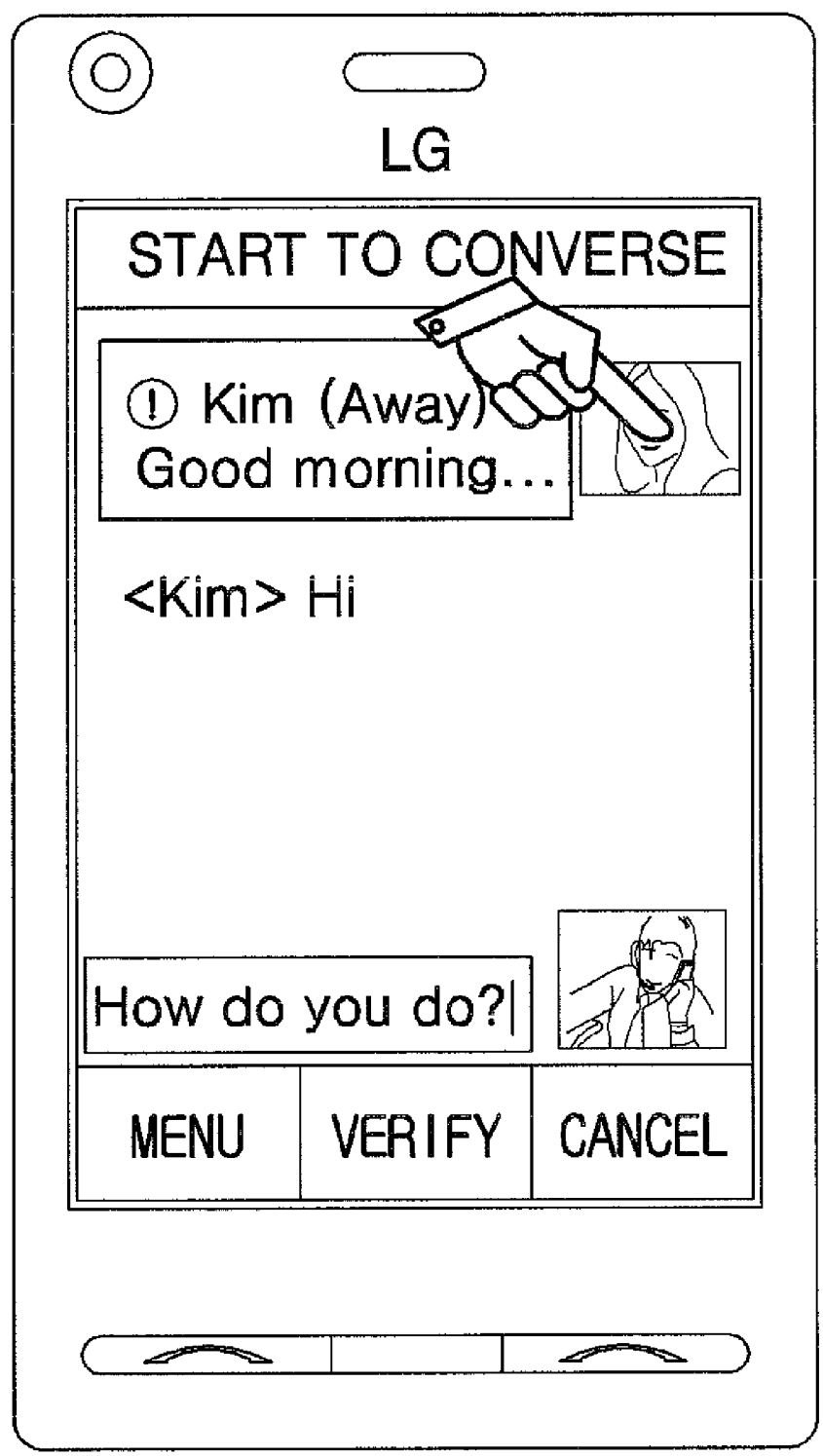

[Figure 17]
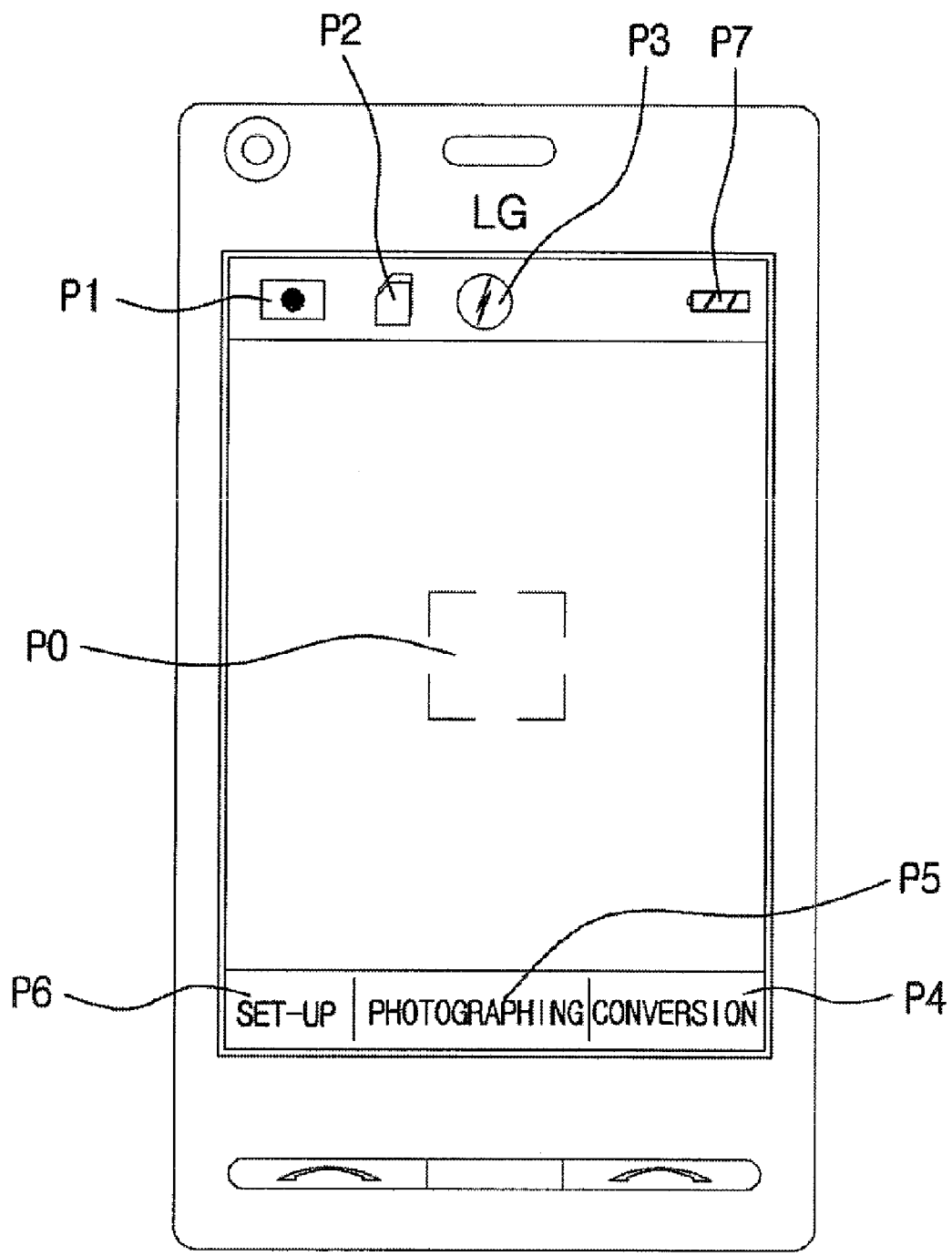

[Figure 18]
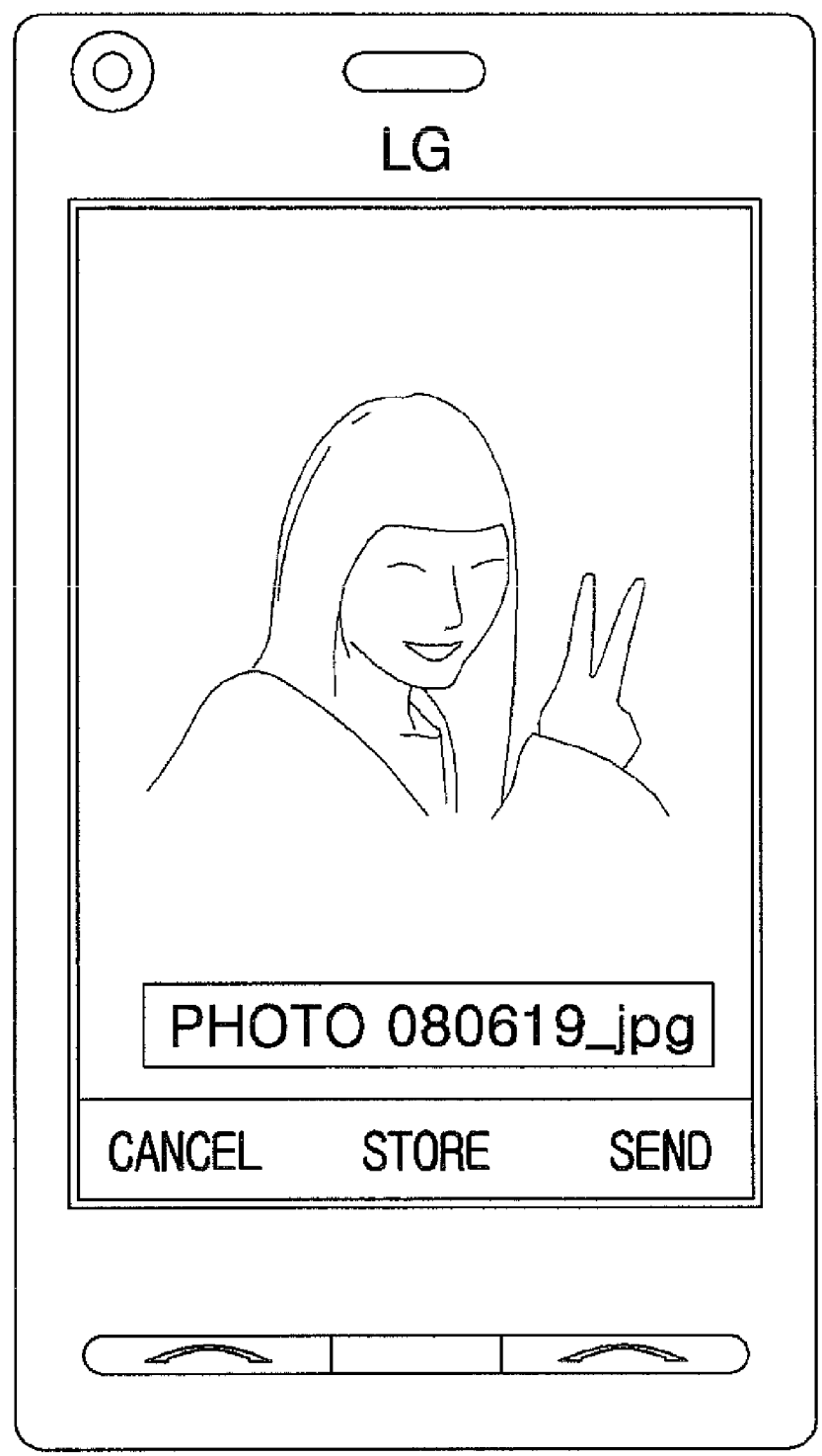

[Figure 19]
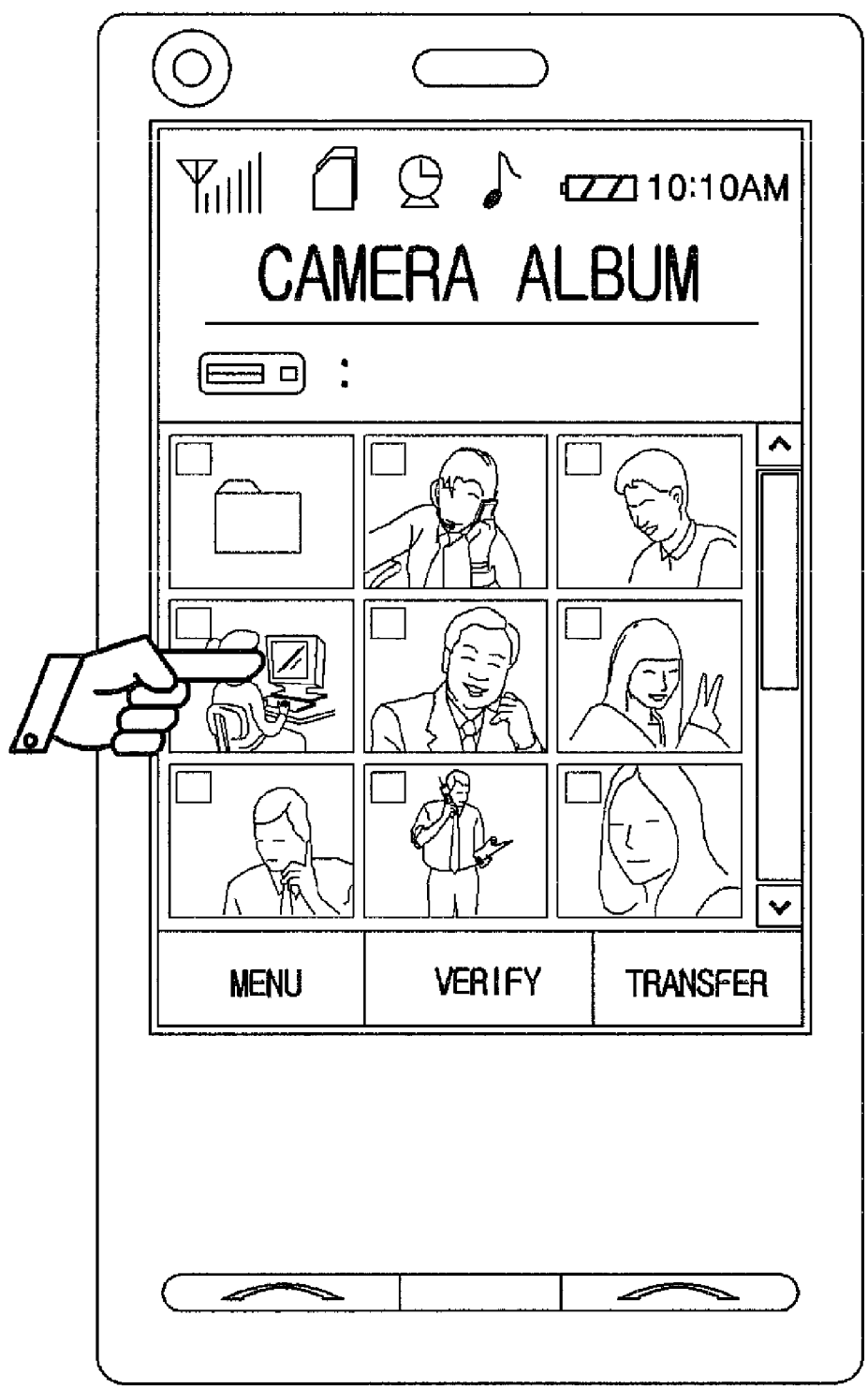

[Figure 20]
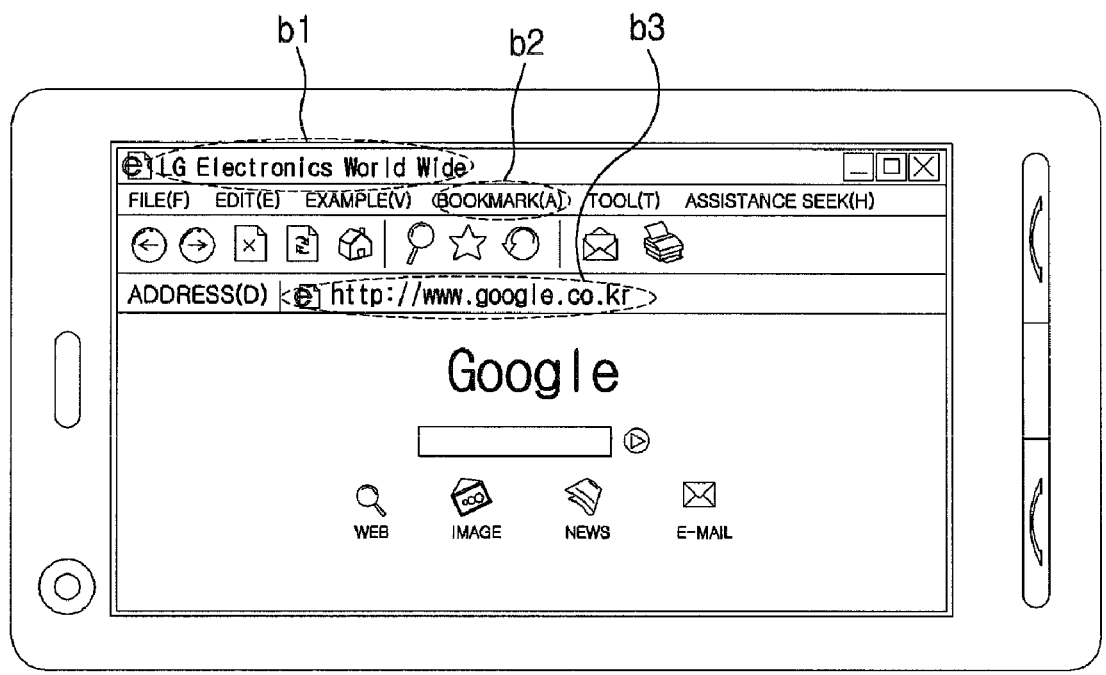

[Figure 21A]
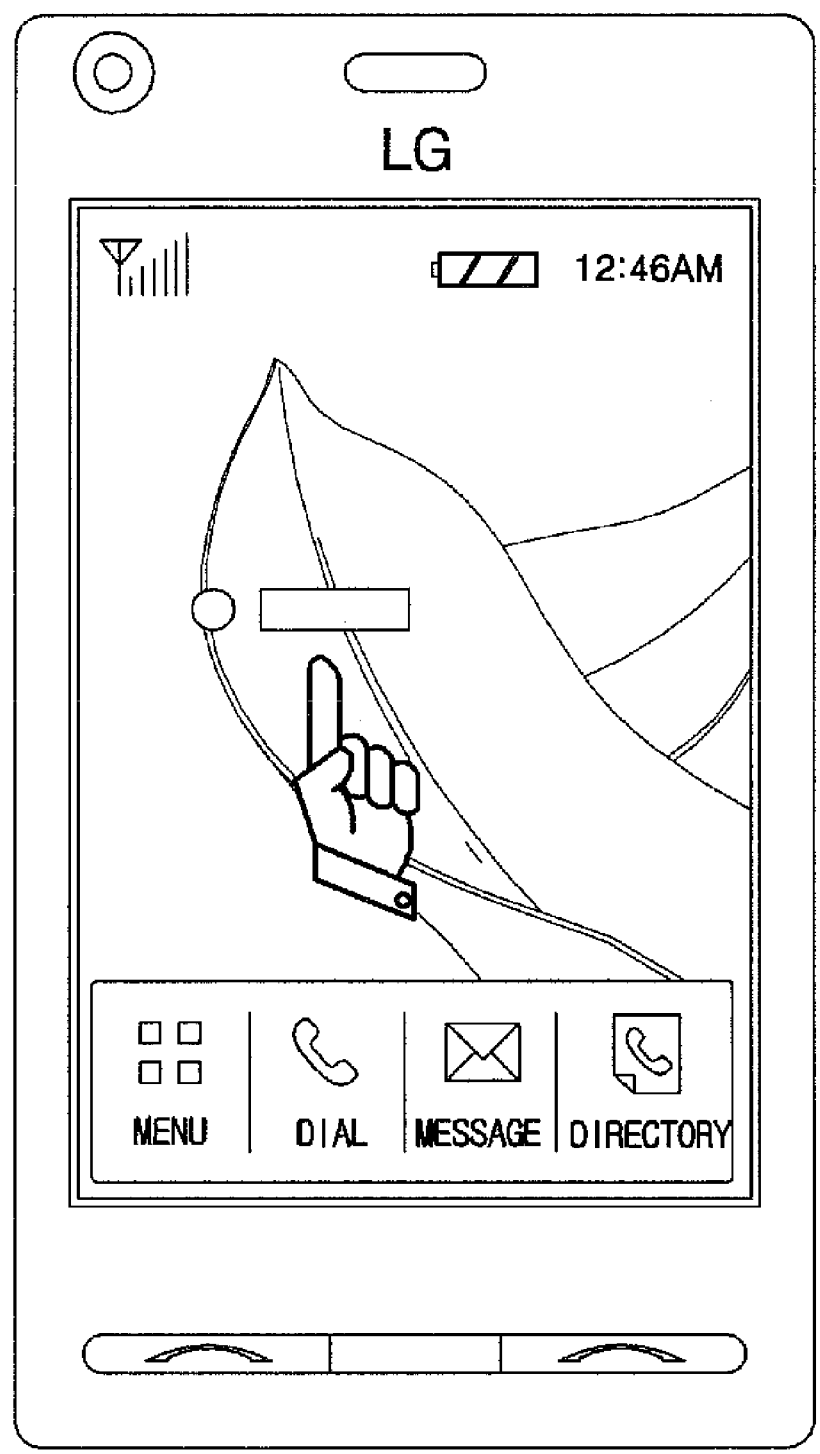

[Figure 21B]
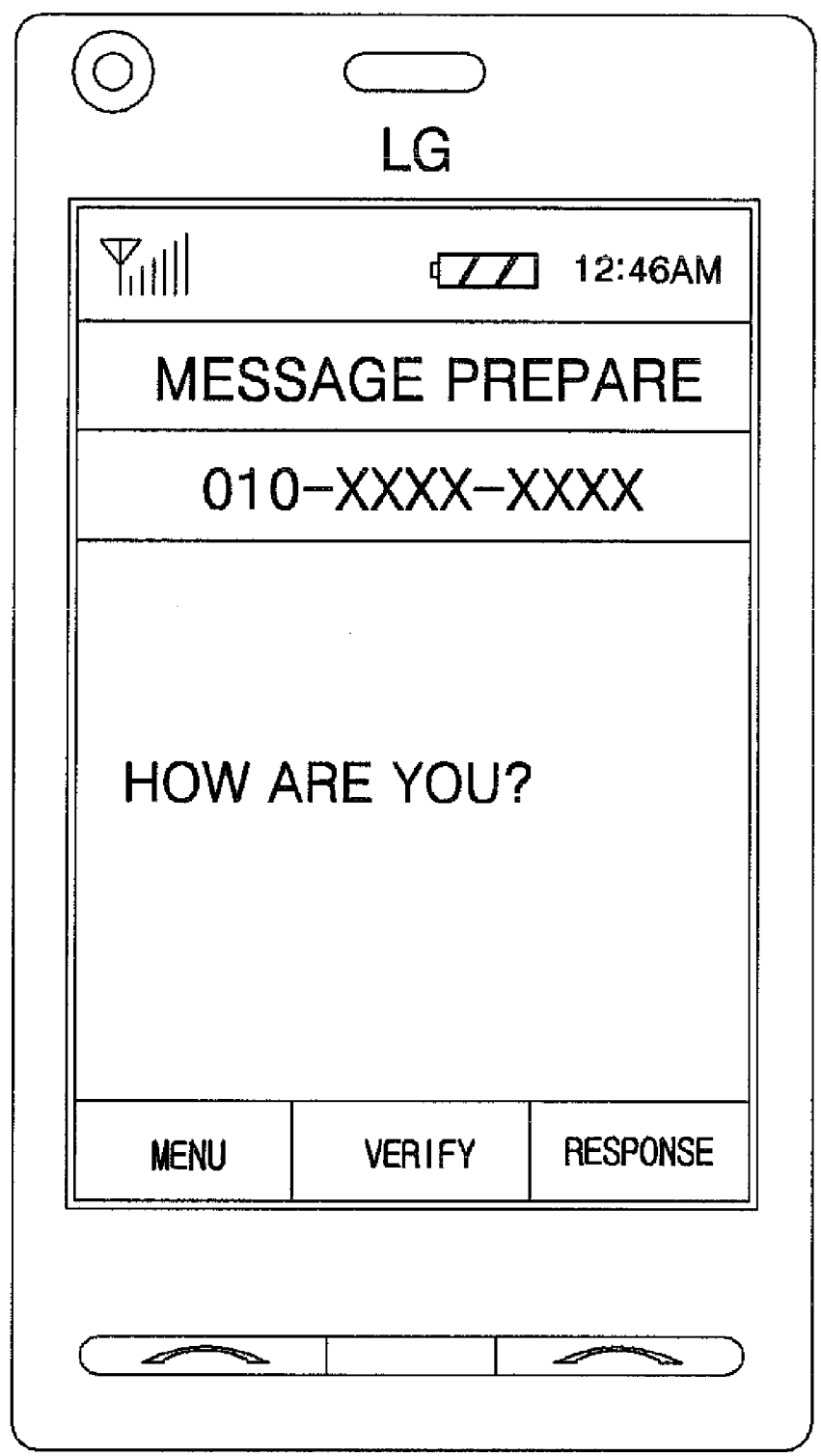

[Figure 22A]
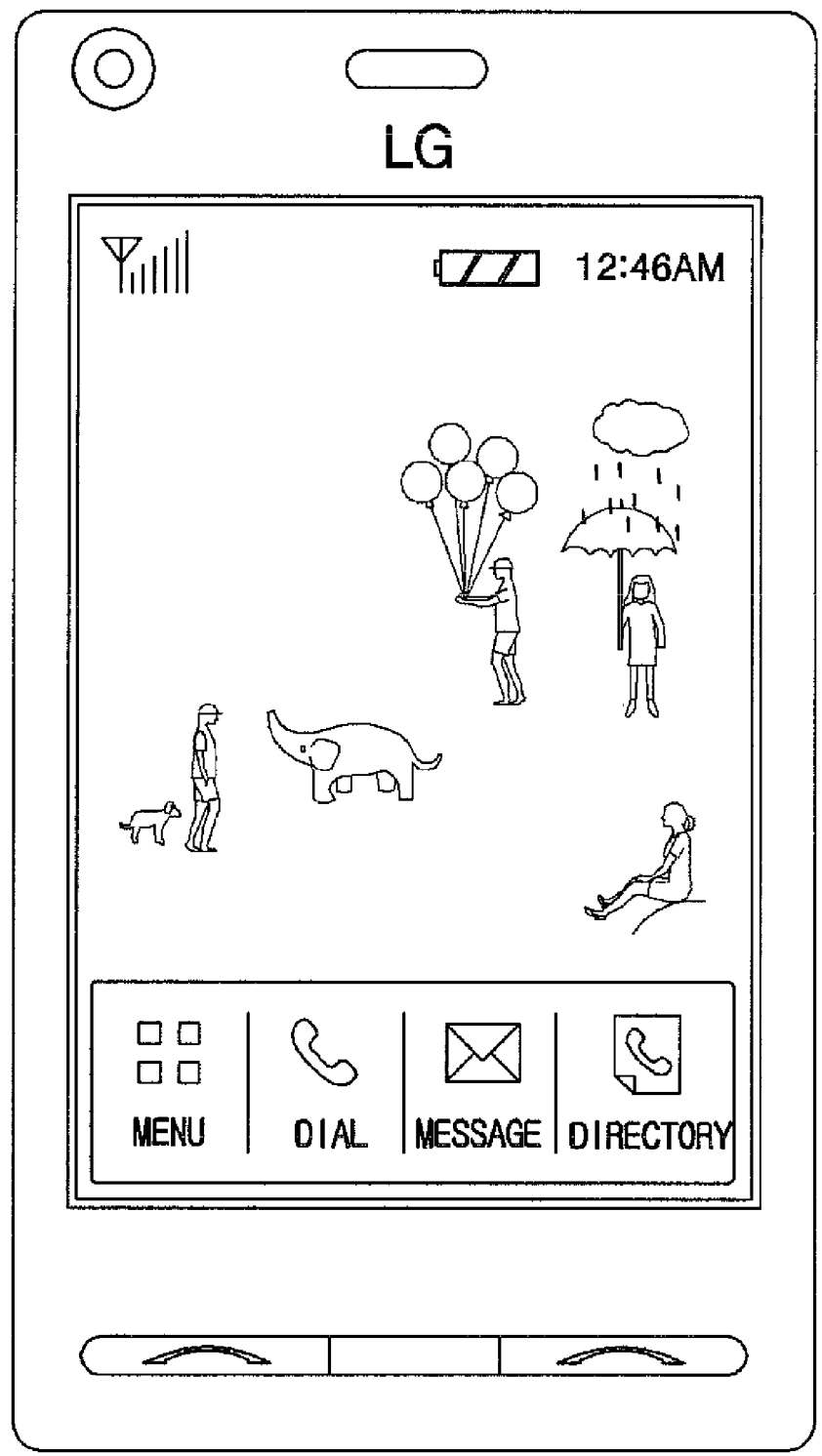

[Figure 22B]
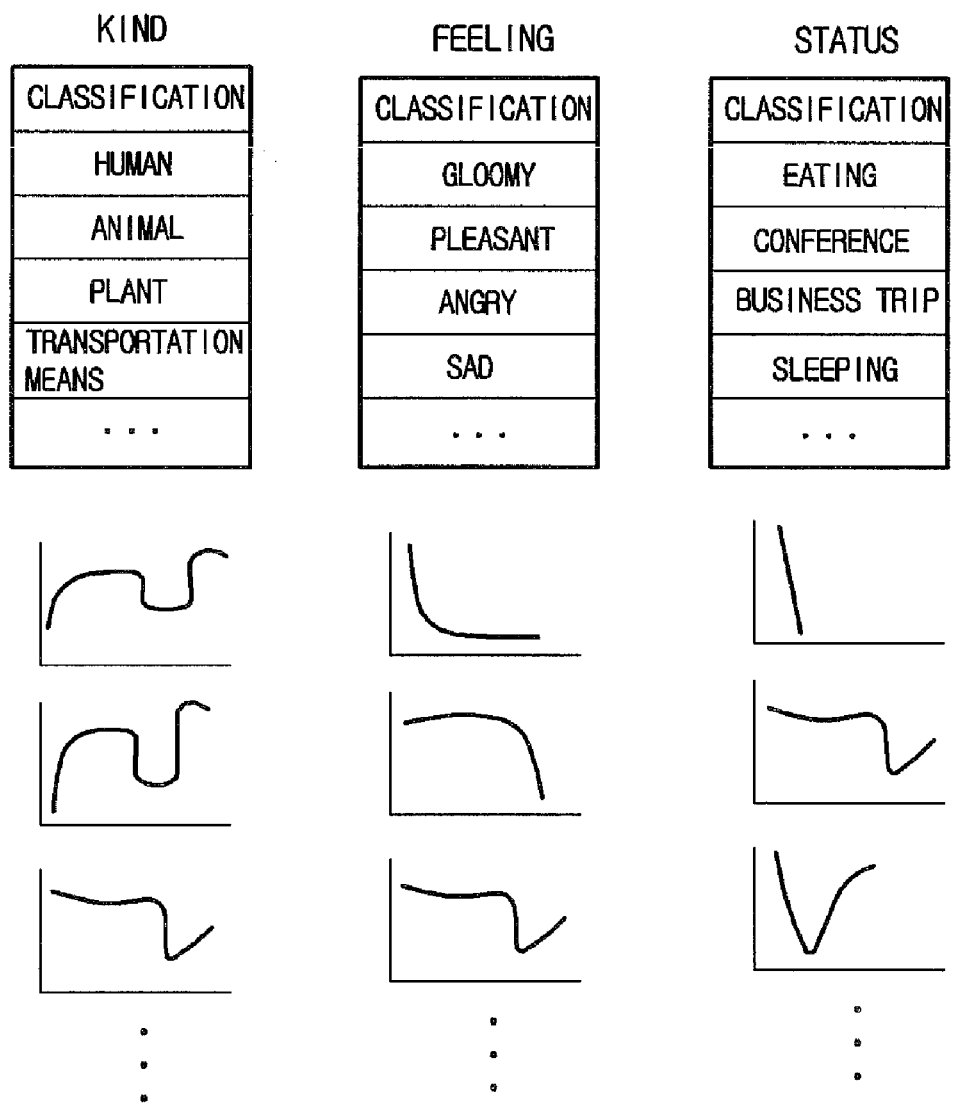

[Figure 23A]
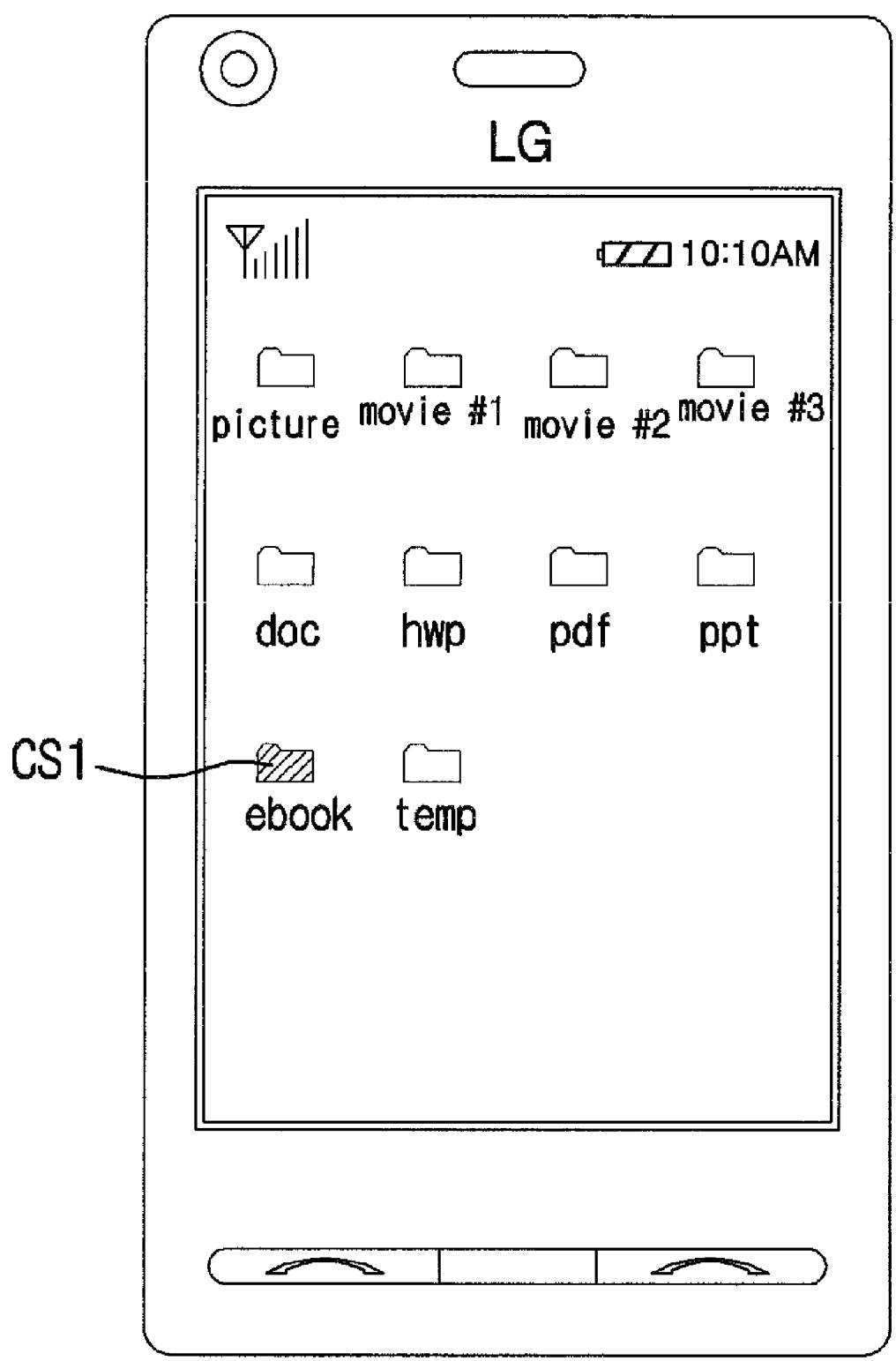

[Figure 23B]
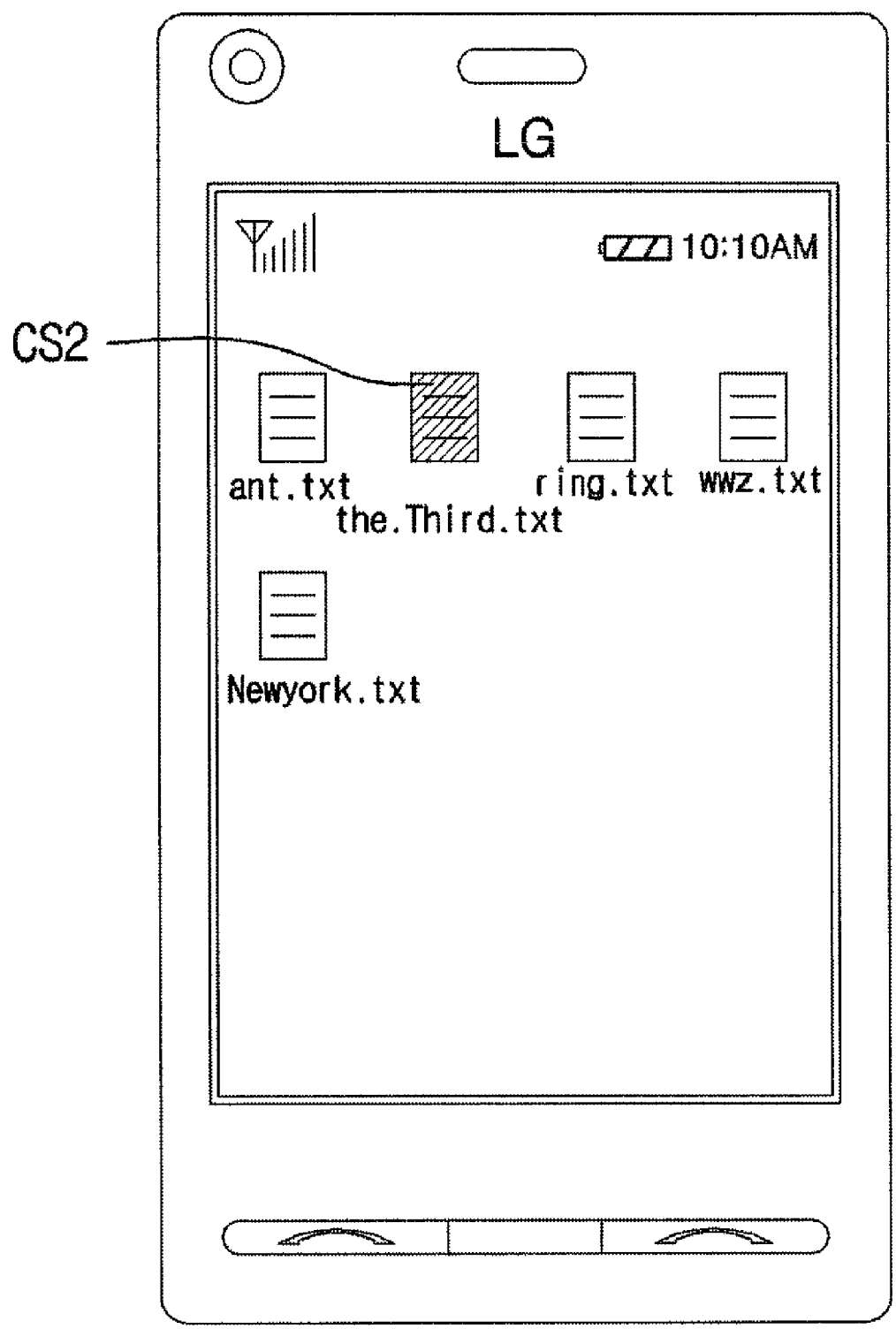

PORTABLE TERMINAL AND DRIVING METHOD OF THE SAME

The present application claims priority from Korean Application No. 10-2008-0063458, filed Jul. 1, 2008, the subject matter of which is incorporated herein by reference.

BACKGROUND

1. Field

Embodiments of the present invention may relate to a portable terminal and driving method for responding via vibration patterns based on pointing operations by a user.

2. Background

A portable terminal is a mobile device that may have one or more functions, such as performing voice and video call communication, data input/output and data storage.

The portable terminal is a comprehensive multimedia device that can support various operations, such as capturing images or videos, reproducing music or video files, allowing a user to play games and/or receiving broadcast contents.

In order to implement complex functions, hardware and/or software implementations have been developed. For example, a user interface may be provided that allows a user to search for and select various functions.

The portable terminal may be considered an individual personal device for expressing individual personal characters.

The portable terminal may include a motion detection device, a touch screen, and/or a vibration generator capable of generating various vibrated patterns to thereby strengthen a tactile user interface function.

BRIEF DESCRIPTION OF THE DRAWINGS

Arrangements and embodiments may be described in detail with reference to the following drawings in which like reference numerals refer to like elements and wherein:

FIG. 1 is a block diagram of a portable terminal according to an example arrangement;

FIG. 2 is a front view of a portable terminal according to an example arrangement;

FIG. 3 is a rear view of a portable terminal according to an example arrangement;

FIG. 4 illustrates a touch screen according to an example arrangement;

FIG. 5 illustrates a principle for detecting a short distance of an object using the touch screen of FIG. 4;

FIG. 6 is a view illustrating a position detection principle of an object using the touch screen of FIG. 4;

FIG. 7 is a flowchart illustrating a driving method of a portable terminal according to an example embodiment;

FIG. 8A is a reception standby screen of a portable terminal according to an example embodiment;

FIG. 8B is a drawing for mapping distinguishing detailed domains divided by pointing of an indicator on a reception screen;

FIGS. 9A and 9B illustrate a reception sensitivity of an antenna and a vibration pattern indicating a battery charge level;

FIGS. 10A and 10B are graphs illustrating a time indicated by way of a vibration according to an example embodiment;

FIG. 10C illustrates a reception standby screen of a portable terminal indicating time and date information according to an example embodiment;

FIG. 11 illustrates a keypad display screen of a portable terminal having a touch screen according to an example embodiment;

FIG. 12 illustrates differently outputting a vibration pattern according to another party's status when a user presses a call key by designating a relevant telephone number of the user for telephone communication with a particular person;

FIGS. 13A-13D illustrate a display screen displaying a result relative to transmission of a message on a portable terminal;

FIG. 14 illustrates a message reception list screen of a portable terminal according to an example embodiment;

FIG. 15 illustrates a moving image reproduction screen of a portable terminal having a touch screen according to an example embodiment;

FIGS. 16A and 16B illustrate an instant messenger performance screen of a portable terminal having a touch screen according to an example embodiment;

FIG. 17 illustrates a display screen of a portable terminal during photographing according to an example embodiment;

FIG. 18 illustrates a display screen of a portable terminal after photographing according to an example embodiment;

FIG. 19 illustrates a camera album screen relative to photo files on a portable terminal having a touch screen according to an example embodiment;

FIG. 20 illustrates a screen that has loaded an internet browser on a portable terminal having a touch screen according to an example embodiment;

FIGS. 21A and 21B illustrate applying a touch screen and a vibration pattern output to a Morse code input/output on a portable terminal having a touch screen according to an example embodiment;

FIGS. 22A and 22B illustrate a game execution screen and tables for a portable terminal having a touch screen according to an example embodiment; and FIGS. 23A and 23B illustrate a folder screen and a status screen on a portable terminal having a touch screen according to an example embodiment.

DETAILED DESCRIPTION

FIG. 1 is a block diagram of a portable terminal according to an example arrangement. Other arrangements may also be provided. The portable terminal may be a mobile terminal (or mobile phone), for example.

FIG. 1 shows that a portable terminal 100 may include a radio communication unit 110, an A/V (Audio/Video) input unit 120, a manipulation unit 130, a sensing unit 140, an output unit 150, a memory 160 (or storage), an interface unit 170, a controller 180, a power supply unit 190, and other elements. Two or more elements may be combined in a single element or a single element may be divided into two or more elements when in implementation.

The radio communication unit 110 may include a broadcasting reception module 111, a mobile communication module 112, a radio internet module 113, a short-range communication module 114 and a GPS module 115.

The broadcasting reception module 111 may receive broadcasting signals and/or broadcasting related information from an external broadcasting management server (not shown) via a broadcasting channel. The broadcasting channel may include a satellite channel or a terrestrial channel or some other type of communication channel. The broadcasting management server may refer to a server that generates and transmits broadcasting signals and/or broadcasting related information or the broadcasting management server may refer to a server that receives previously generated broadcasting signals and/or broadcasting related information and transmits such information to a terminal. The broadcasting related information may refer to information related to a broadcasting channel, a broadcasting program or a broadcasting service provider. The broadcasting signal may include, not only a TV broadcasting signal, a radio broadcasting signal, a data broadcasting signal, but also a broadcasting signal obtained by combining a data broadcasting signal with a TV broadcasting signal or a radio broadcasting signal.

The broadcasting related signal may be provided via a mobile communication network, and in such a case, such information may be received by the mobile communication module 112.

The broadcasting related information may be implemented in various formats. For example, the broadcasting related information may include an Electronic Program Guide (EPG) of a Digital Multimedia Broadcasting (DMB) format, or an Electronic Service Guide (ESG) of a Digital Video Broadcasting-Handheld (DVB-H) format.

The broadcasting reception module 111 may receive broadcasting signals by using various digital broadcasting techniques. More particularly, the digital broadcasting signals may be received by using digital broadcasting techniques, such as DMB-T (Digital Multimedia Broadcasting-Terrestrial), DMB-T (Digital Multimedia Broadcasting-Satellite), MediaFLO Media Forward Link Only), DVB-H (Digital Video Broadcasting-Handheld) and ISDB-T (Integrated Services Digital Broadcasting-Terrestrial). The broadcasting reception module 111 may be suitable for other broadcasting techniques that provide broadcasting signals and information.

The broadcasting signals and/or broadcasting associated information received via the broadcasting reception module 111 may be stored in the memory 160.

The mobile communication module 112 may transmit and receive radio signals to and from at least one of a base station, an external terminal and a server of a mobile communication network. The radio signals may include voice call signals, video (or conference) communication call signals, data in various formats based on the transmission and reception techniques used, text/multimedia messages and other types of information.

The radio internet module 113 may be a module that supports radio access to a network such as Internet. The radio internet module 113 may be installed in the portable terminal or may be implemented as an internal element or an external element.

The short range communication module 114 may be a module that supports short range communications. Suitable technologies for implementing this module may include Bluetooth, Radio Frequency Identification (RFID), Infrared Data Association (IrDA), Ultra Wideband (UWB) and Zig-Bee. The GPS module 115 may receive navigational information from a plurality of satellites.

The A/V input unit 120 may receive audio signals or video signals and may include a camera module 121 and a microphone module 122. The camera module 121 may process image frames such as motionless images or videos (moving images) that are obtained by an image sensor in a video call (or video conference) mode or in an image capture mode. The processed image frames may then be displayed on a display module 151 (of the output unit 150).

The image frames processed by the camera module 121 may be stored in the memory 160 or may be transmitted to outside the portable terminal via the radio communication unit 110. Two or more camera modules 121 may be provided according to configuration and aspects of the portable terminal.

The microphone module 122 may receive an external sound signal from a microphone in a calling mode, a recording mode or a voice recognition mode and may process such sound signals into electrical audio (voice) data. The processed audio data may be converted for output into a format that can be transmittable to a mobile communication base station via the mobile communication module 112 in a calling mode. The microphone module 122 may include noise canceling algorithms (or other processing mechanisms) to cancel noise generated in the course of receiving the external audio signals.

The manipulation unit 130 (or input unit) may generate key input data based on user inputs to control operations of the portable terminal. The manipulation unit 130 may be a key pad, a dome switch, a touch pad (e.g., employing touch recognition techniques based on pressure, capacitance, resistance and the like), a jog wheel and/or a jog dial switch. When the touch pad is combined with the display module 151, as will be described below, in a layered structural manner, the combination may be referred to as a touch screen.

The sensing unit 140 may sense a current state (or configuration) of the portable terminal (i.e., an opened state or a closed state), a location (or orientation) of the portable terminal 100, and/or whether the user has touched a certain portion of the portable terminal. Based on such sensing, a sensing signal may be generated for controlling operation of the portable terminal 100.

For example, if the portable terminal is a slide-type portable terminal, the sensing unit 140 can sense whether a slide portion of the slide type portable terminal is opened or closed with respect to a main body portion of the portable terminal. The sensing unit 140 may also perform a sensing function to detect whether the power supply unit 190 has supplied power or whether the interface unit 170 is connected with an external device.

The interface unit 170 may interface with various external devices that can be connected with the portable terminal 100. The various external devices may include a wired or wireless headset, an external charger, a wired or wireless data port, a card socket (i.e., for coupling a memory card or a SIM/UIM card), an audio input/output port, a video input/output port, and an earphone. The interface unit 170 may receive data from the external device or may be provided with power such that the received data or power can be delivered to particular elements of the portable terminal 100 or may be used to transmit data and other information from the portable terminal 100 to the external device.

The output unit 150 may provide outputs such as audio signal, a video signal or an alarm signal. The output unit 150 may include a display module 151, an audio output module 152 and/or an alarm output module 153.

The display module 151 may output and display information processed by the portable terminal 100. For example, the display module 151 may display a particular User Interface (UI) or a Graphic User Interface (GUI) related to the call operation when the portable terminal 100 is in a calling mode. The display module 151 may display a captured and/or received image, or a particular UI and/or a particular GUI when the portable terminal 100 is in a video calling mode or an image capturing mode.

If the display module 151 and the touch pad are formed together in a layered manner to form a touch screen, the display module 151 may be used as an input device as well as an output device. The display module 151 may be one of a liquid crystal display, a thin film transistor-liquid crystal display, an organic light emitting diode, a flexible display and a three-dimensional (3D) display. The display module 151 may include two or more such displays according to a particular implementation of the portable terminal 100. For example, the portable terminal 100 may be provided with an external display module (not shown) and an internal display module (not shown) at a same time.

The audio output module 152 may output audio data that has been received from the radio communication unit 110 in a call signal reception mode, a calling mode, a recording mode, a voice recognition mode or a broadcasting reception mode. The audio output module 152 may also output audio data that has been stored in the memory 160. The audio output module 152 may output an audio signal related to a function (e.g., a call signal reception sound and a message reception sound) performed by the portable terminal 100. The audio output module 152 may include a speaker and a buzzer, for example.

The alarm output module 153 may output a signal that indicates an occurrence of an event of the portable terminal 100. The event occurring in the portable terminal 100 may be, for example, a call signal reception requesting a telephone call, a message reception, a key signal input and an alarm that indicates a predetermined time. The alarm output module 153 may output a signal indicating an occurrence of an event in a format other than an audio signal or a video signal. The alarm output module 153 may output a signal, for example, in the form of a vibration. When a call signal or a message is received, the alarm output module 153 may provide a vibration in order to inform about the received call signal or message. When a key signal is received, the alarm output module 153 may provide vibrations as feedback of the inputted key signal. The user may recognize the occurrence of an event based on the vibrations. The occurrence of an event may be informed to the user via the display module 151 and/or the audio output module 152.

The memory 160 (or storage) may store software programs (or codes, instructions, etc.) to support processing and controlling performed by the controller 180. The memory 160 may temporarily store inputted or outputted data (e.g., a phone book, a message, a still image, or video).

The memory 160 may include a storage medium of at least one of a flash type memory, a hard disk type memory, a multimedia card, a card type memory (e.g., SD card, XD card, etc.), a RAM and a ROM, for example. The portable terminal 100 may cooperate with a network storage device capable of performing the functions of the memory 160 via network access (such as via the Internet).

The controller 180 may control general operations of the portable terminal. For example, the controller 180 may perform controlling and processing associated with handling a voice call, data communication, a video call, etc. In addition, the controller 180 may include a multimedia reproduction module 181 for reproducing multimedia data. The multimedia reproduction module 181 may be formed as a hardware component within the controller 180 or may be formed as a software component separately from the controller 180.

The controller 180 may identify a proximity touch or a direct touch of the touch screen by an object (e.g., a finger of a user, a stylus and/or a touch pen). The controller 180 may be formed with a scroll bar or a mini map for controlling size or area of a screen displayed on the touch screen. A further detailed description of the controller 180 will be provided below.

The power supply unit 190 may receive external power or internal power and supply the power required for operation of various elements under control of the controller 180.

The portable terminal may be explained in terms of elements from the perspective of their functions. Hereinafter, the portable terminal according to embodiments of the present invention may be explained in terms of external elements with reference to FIGS. 2 and 3. For simplicity, a touch screen-type portable terminal (among different types of portable terminals such as a folder type, a bar type, a swing type and a slider type) may be referenced to explain exemplary implementations. However, features described herein are not limited to a touch screen-type portable terminal, but rather can be applicable to other types of portable terminals.

FIG. 2 is a front view of a portable terminal according to an example arrangement. Other arrangements may also be provided.

As shown in FIG. 2, the portable terminal 100 may include a first body 100A and a second body 100B that is slidably moving along at least one direction on the first body 100A. A state in which the first body 100A overlaps the second body 100B may be called a closed configuration (or a closed state). As shown in FIG. 2, a state in which the first body 100A is moved to expose at least a portion of the second body 100B may be called an open configuration (or an open state).

In the closed configuration, the portable terminal may operate mainly in a standby mode, and the standby mode may be released according to a user manipulation. In the open configuration, the portable terminal may operate mainly in the calling mode, and the operation state may be changed into the standby mode upon lapse of a certain time or according to a user manipulation.

The case (i.e., a casing, a housing, a cover, etc.) constituting an external appearance of the first body 100A may include a first front case 100A-1 and a first rear case 100A-2, and various electronic components may be installed in a space therebetween. One or more intermediate cases may be additionally provided between the first front case 100A-1 and the first rear case 100A-2.

The cases may be formed by injection-molding of a synthetic resin or may be made of a metallic material, such as stainless steel (STS) or titanium (Ti).

The display module 151, the first audio output module 152-1, the first camera module 121-1 and/or a first manipulation unit 130-1 may be provided on the first body 100A (e.g., substantially on the first front case 100A-1).

The display module 151 may include a Liquid Crystal Display (LCD), an Organic Light Emitting Diode (OLED), or the like that visually displays information.

A touch panel (or touch pad) may be overlaid (overlapped, superimposed, covered) on the display module 151 in a layered manner to allow the display module 151 to operate as a touch screen, whereby the user may input information or commands by touching the display module 151. The touch screen may be considered an input device or receiving device to receive pointing information from an object such as a finger, a stylus or a touch pen.

The first audio output module 152-1 may be implemented as a receiver or a speaker to output various types of sounds.

The first camera module 121-1 may be suitably implemented for capturing still images, moving images, videos, or other visual information.

The manipulation unit 130-1 may receive user commands for controlling network contents reproduction and travel guide operations.

Similar to the first body 100A, the case constituting an external appearance of the second body 100B may include a second front case 100B-1 and a second rear case 100B-2.

A second manipulation unit 130-2 may be provided on the second body 100B, and more specifically may be provided on a front face portion of the second front case 100B-1.

A third manipulation unit 130-3, a microphone module 122, and an interface unit 170 may be provided on the second front case 100B-1 or the second rear case 100B-2.

The first, second and third manipulation units 130-1, 130-2, 130-3 may be collectively referred to as the manipulation unit 130, and any means can be employed as the first, second and third manipulation units 130-1, 130-2, 130-3 provided they can be operated in a tactile manner. The manipulation unit 130 may be considered a receiving device to receive information regarding input by a user.

The manipulation unit 130 may be implemented by using dome switches or touch pads that can receive a user command or information according to press or touch operations by the user (i.e., pointing information). The manipulation unit 130 may also be implemented using a mechanical manipulation means, such as a rotatable element (e.g., a wheel, dial, jog button, thumbwheel, etc.) or a linear movement element (e.g., a joystick, lever, knob, etc.). The manipulation unit 130 may receive pointing information based on an object or based on movement of a cursor using the rotatable element or the linear movement element.

The first manipulation unit 130-1 may include one or more function keys used for inputting a command such as start, end or scroll, and the second manipulation unit 130-2 may include one or more keypads for inputting numbers, characters, and symbols.

The third manipulation unit 130-3 may be a hot key for activating a special function of the portable terminal.

The microphone module 122 may receive a voice of the user or other sounds.

The interface unit 170 may be used as a passage (path or link) that allows data to be exchanged with an external device through a wired or wireless medium. For example, the interface unit 170 may be a connection port used for connection of an ear jack, earphones, and the like, a communication port that supports short-range communications (e.g., an IrDA port, a Bluetooth. T.M. port, a wireless LAN port, etc.), and/or a power supply port for supplying power to the portable terminal.

The interface unit 170 may include a card socket for receiving or accommodating a card-like medium, such as a Subscriber Identification Module (SIM) card, a User Identity Module UIM card and/or a memory card for storing information.

The power supply unit 190 may be mounted at a side (or edge) portion of the second rear case 100B-2 for supplying power to the portable terminal 100. The power supply 190 may be a rechargeable battery that can be releasably attached with the portable terminal.

FIG. 3 is a rear view of a portable terminal according to an example arrangement. Other arrangements may also be provided.

As shown in FIG. 3, a second camera module 121-2 may be additionally mounted on a rear surface of the second rear case 100B-2 of the second body 100B. The second camera module 121-2 may have an image capture direction that is substantially opposite to an image capture direction of the first camera module 121-1 shown in FIG. 1. The second camera module 121-2 may support a different number of pixels when compared to the first camera module 121-1.

The first camera module 121-1 may be used for low resolution (i.e., supporting a relatively small number of pixels) to quickly capture an image (or video) of a user's face for immediate transmission to another party during video conferencing or the like, while the second camera module 121-2 may be used for high resolution (i.e., supporting a relatively large number of pixels) in order to capture more detailed (i.e., higher quality) images or video that typically do not need to be transmitted immediately.

A flash 121-3 and a mirror 121-4 may be adjacently provided at the second camera module 121-2. When an image of a subject is captured by the second camera module 121-2, the flash 121-3 may illuminate the subject. The mirror 121-4 may allow the user to see himself or herself when he or she wants to capture his or her own image (i.e., perform a self-image capturing) by using the second camera module 121-2.

A second audio output module 152-2 may be additionally provided on the second rear case 100B-2. The second audio output module 152-2 may implement a stereophonic function in conjunction with the first audio output module 152-1 shown in FIG. 2. The second audio output module 152-2 may be used in a speaker phone mode for call communication.

A broadcasting signal reception antenna 111-1 may be provided at one side of the second rear case 100B-2 in addition to an antenna used for call communication. The antenna 111-1 may be installed such that the antenna 111-1 may extend from the second body 100B.

One part of a slide module 100C that slidably connects the first body 100A with the second body 100B may be provided on the first rear case 100A-2 of the first body 100A. The other part of the slide module 100C may be provided on the second front case 100B-1 of the second body 100B, which may not be exposed to the outside as shown in FIG. 3.

In the above description, the second camera module 121-2 and the like are provided on the second body 100B. Other configurations may also be provided.

One or more of the elements 111-1, 121-2, 121-3, 152-2 that are provided on the second rear case 100B-2 may also be mounted on the first body 100A such as on the first rear case 100A-2. Elements provided on the first rear case 100A-2 may be protectively covered by the second body 100B when the portable terminal is in the closed configuration. In addition, even if the second camera module 121-2 is not separately mounted, the first camera module 121-1 may be configured to rotate to thereby enable image capturing up to the image capturing direction of the second camera module 121-2.

FIG. 4 illustrates a touch screen according to an example arrangement. Other arrangements may also be provided.

As shown in FIG. 4, the display module 151 may be overlaid (i.e., overlapped, superimposed, covered) on a touch panel 400 in a layered manner to operate as a touch screen 500. The touch panel 400 or the touch screen 500 may be considered a receiving device to receive inputs by a user.

The touch panel 400 shown in FIG. 4 may include a squared conduction film 411 made of transparent conductive material such as Indium Tin Oxide (ITO) and metal electrodes 412-1, 412-2, 412-3 and 412-4 each formed at a edge of each conductive film 411. The conductive film 411 may be formed thereon with a protective film 420.

The touch panel 400, which is a position detection device (or input device) of capacitive sensing type, may be formed with electric field lines between transmission side metal electrodes 412-1 and 412-4 and reception side metal electrodes 412-2 and 412-3 by an alternating current (AC) voltage applied to the transmission side metal electrodes 412-1, 412-4. The formed electric field lines extend to outside of the touch panel 400 via the protective film 420.

When an object (e.g., digits of a user) comes near the touch panel 400 or directly touches the touch panel 400, the electric field lines may be partially interrupted to generate a change on phase and size of current flowing to the reception side metal electrodes 412-2, 412-3. This is because the human body has a static capacity of several pFs relative to ground to distort the electric field lines formed on the touch panel 400 when a user has fingers near to or touches the touch panel 400.

Processes (not shown) formed inside the portable terminal 100 may use the current change of the reception side metal electrodes 412-2, 412-3 in response to touch operation of the object to detect a distance neared by the object and a position where the touch has occurred. This may correspond to position information.

The object may include not only fingers of the user, but also objects capable of identifying a touch input by the portable terminal 100 by distorting the electric field lines formed on the touch pad 400. For example, the object may also include a stylus or other pointing device. The terms stylus and touch pen may hereafter be used interchangeably.

FIG. 5 is a drawing illustrating a principle for detecting a short distance of an object using the touch screen 500 of FIG. 4. Other arrangements may also be provided.

As shown in FIG. 5, application of an AC voltage 430 to the transmission side metal electrode 412-1 (from metal electrodes 412-1 to 412-4) formed on the transparent conductive film 411 may form electric field lines (i.e., electric lines of force 501, 502 and 503) between the transmission side metal electrode 412-1 and the reception side metal electrode 412-2. The electric field lines 501, 502 and 503 may be extensively formed to a vertical upward direction (i.e., a z direction) of the touch screen 500.

The amount of electric field lines 501, 502 and 503 interrupted by a finger 510 may be changed based on proximity to the touch screen 500 by the finger 510 of the user. In other words, as the hand nears the touch screen 500, the finger 510 may increase influence applied to the electric field lines 501, 502 and 503.

The influence applied to the electric field lines 501, 502 and 503 by the finger 510 may change the current applied to current detection units 440-1, 440-2 connected to the metal electrodes 412-1, 412-2, where the current detection units 440-1, 440-2 detect the changed current and provide the change to an Analog-to-Digital Converter (ADC) 450. The ADC 450 may convert the current amount inputted in the form of an analog signal to a digital value and provide the digital value to a touch time measurement unit 460.

The touch time measurement unit 460 may measure a time that the finger 510 stays within a touch identification effective distance (i.e., 'd1' of FIG. 5) capable of identifying proximity of the finger 510 by the touch screen 500 from information relative to the changed current amount provided by the ADC 450. The touch time measurement unit 460 may recognize that a proximity touch or a direct touch operation is being performed if the finger 510 stays beyond a predetermined time (i.e., 1 second) within the proximity touch identification effective distance (i.e., 'd1' of FIG. 5). If the finger 510 stays shorter than a predetermined time (i.e., 1 second) within the proximity touch identification effective distance (i.e., 'd1' of FIG. 5), the touch time measurement unit 460 may determine that a proximity touch or a direct touch operation is not being performed.

If it is determined that there is a touch input in response to the proximity touch or direct touch operation relative to the touch screen 500, the touch time measurement unit 460 may provide information on touch input generation information and current change amount to a distance detection unit 470.

The distance detection unit 470 may calculate a distance between the finger 510 and the touch screen 500, i.e., a distance separated from the touch screen 500 by the finger 510 toward the vertical upward direction (i.e., z direction) from the information on the provided current change amount.

More specifically, if the finger 510 is positioned at a location nearer than d1 from the vertical direction of the touch panel 400 (i.e., z direction) but further than d2 (i.e., 20 mm, a location between d1 and d2), then the distance detection unit 470 may determine that the finger 510 has entered within the touch identification effective distance from which to detect whether the touch screen 500 starts to be touched by an external object, and may provide a function corresponding to the proximity touch operation. The proximity touch may be defined by a state of an object (i.e., a finger of a user or a stylus) being positioned within the touch identification effective distance of the touch screen 500 for inputting a user command. The proximity touch of the object not directly touching the touch screen 500 may be distinguished from the direct touch operation that directly touches the touch screen 500 by the object.

If the finger 510 is positioned on a location closer than d2 (i.e., 20 mm) from the vertical direction of the touch panel 400 (i.e., the z direction) but further than d3 (i.e., 10 mm, a location between d2 and d3), then the distance detection unit 470 may determine that the finger 510 has fairly approached the touch screen 500. If the finger 510 is positioned on a location shorter than d3 (i.e., 10 mm) (i.e., positioned within d3) from the vertical direction of the touch panel 400 (i.e., the z direction) (i.e., positioned within d3) or the finger 510 has directly touched the surface of the touch screen 500, the distance detection unit 470 may determine that the finger 510 has directly touched the touch screen 500 within an error scope.

Although touch operation of the finger 510 have been described with respect to three distances between the finger 510 and the touch screen 500, the description of the touch operation may be classified in four distances (or other numbers) for further accuracy.

A position detection unit 480 may calculate, from information on a changed current amount, a position on the touch screen 500 indicated by the finger 510 (i.e., a horizontal coordinate of x and y directions on the touch screen 500). The y direction is a vertical direction relative to the x and z directions shown in FIG. 5. The position detecting unit 480 may determine coordinate values on a display screen based on the received user input.

The measured vertical distance between the finger 510 and the touch screen 500 and a horizontal coordinate (both x and y coordinates) of the finger 510 on the touch panel 400 may be transmitted to the controller 180. The controller 180 may determine the user command according to the vertical distance and the horizontal coordinate and perform a control operation in response to the user command and concurrently provide a predetermined graphic user interface (GUI). The structure discussed above may be considered a receiving device for receiving input from a user and determining a coordinate value on a display screen based on the received user input.

FIG. 6 is a drawing illustrating a position detection principle of an input medium or object using the touch screen of FIG. 4. Other arrangements may also be provided.

When an AC voltage is applied from the AC voltage source to the transmission side metal electrodes 412-1, 412-4 of the touch panel 400, electric field lines (not shown) are formed between transmission side metal electrodes 412-1, 412-4 and the reception side metal electrode 412-2, 412-3.

In addition, if the finger 510 comes close to the touch panel 400 or directly touches the touch panel 400, current changes are generated to the metal electrodes 412-1 to 412-4. Current detection units 440-1, 440-2, 440-3 and 440-4 may measure the current changes, and as described above, the position detection unit 480 may detect the horizontal coordinate (i.e., the x-y coordinates) located on the touch panel 400 by the finger 510 via the current changes and provide the coordinates to the controller 180. The controller 180 may recognize the horizontal coordinate on the touch screen 500 touched by the finger 510 to perform the user command corresponding to the touch operation and provide the predetermined graphic user interface (GUI) onto the display module 151.

Although the touch time measurement unit 460, the distance detection unit 470 and the position detection unit 480 have been separately described according to their functions, the units 460, 470, 480 may also be formed inside the controller 180.

Although the touch screen 500 equipped with the touch panel 400 according to capacitance detection type has been shown in FIGS. 4, 5 and 6 to explain a principle of determining proximity touch and direct touch of an input medium relative to the touch screen 500, other arrangement shapes of the metal electrodes 412-1, 412-2, 412-3 and 412-4 of the touch panel 400 or types of touch panels 400 may be provided as long as a position may be detected by the input medium or object and the distance may be determined between the input medium and the touch screen 500.

For example, the touch panel 400 may detect a proximity position between the input medium (i.e., a finger or a stylus) and the touch panel 400 using a photoelectric sensor that uses laser diodes and light emitting diodes, a high frequency oscillation proximity sensor and electromagnetic proximity sensor, for example. The touch panel 400 may also combine the capacitance detection type and the resistive sensing type by forming metal electrodes on an upper plate or a lower plate for detecting voltage changes according to a position determined by the input medium. The input medium may be a pointing device to provide information to a receiving device or an input device.

The portable terminal may be mounted with a 3-axial accelerometer sensor as a movement detection device. The 3-axial accelerometer sensor may be selected from products that have size and performance appropriate for built-in use for the portable terminal.

Methods for calculating variation patterns using the 3-axial accelerometer sensor are known, and as such a detailed explanation thereto will be omitted and/or briefly explained. A principle of the 3-axial accelerometer sensor will be briefly described herein. In consideration of the fact that an integrated value of acceleration becomes a velocity, and an integrated value of the velocity is a moved distance, a displacement pattern of an object mounted with a sensor can be found using accumulated values of accelerations relative to orthogonal 3-axes, given the point where it has stopped.

A movement detection unit may include a 2-axial accelerometer sensor that is less expensive than the 3-axial accelerometer sensor or a gyro sensor. The movement detection unit may also include a 1-axial accelerometer sensor or a 2-axial rotation detection sensor for detecting rotational movement. The movement detection unit may further include a gravity detection sensor for detecting gravity direction or calculating a 3-axial accelerometer value.

The movement detection unit may output detection values in various shapes. For example, the movement detection unit may output displacement patterns of the portable terminal, or output 3-axial accelerometer values. This may be determined by complexity of the displacement pattern to be applied for command input. If there are too many kinds of commands and the displacement pattern is complex, the displacement pattern may be utilized. If there are a few kinds of commands and the displacement pattern is simple, the 3-axial accelerometer output value may be utilized.

The portable terminal may integrate a vibration generation unit for outputting a vibration or a vibration pattern. In order to determine directivity of a vibration pattern, a directivity of the movement pattern recognized by the movement detection unit may be referred to. This may enable a user to have a same feeling relative to the vibration pattern regardless of grasp directivity of the portable terminal by determining directivity of the vibration pattern relative to the grasping styles of the portable terminal by the user. The vibration generation unit may be mounted with two or more vibration devices each having a different vibration direction (preferably orthogonal).

If the vibration generation unit is mounted with two or more vibration devices each having a different vibration direction, a vibration direction of the movement pattern recognized by the user and the vibration direction generated by the vibration generation unit may be mutually correlated. For example, if the user longitudinally holds the portable terminal, and if a command to a particular application is given selectively in a lengthwise direction or a crosswise direction, it is assumed that the user has selected a lengthwise direction. A positive response to the user command may generate a vibration of the lengthwise direction as instructed by the user, while a negative response to the user command may generate a vibration of crosswise direction opposite to the user command. Therefore, an area for recording the vibration direction of the movement pattern instructed by the user may be provided at the memory 160 of the portable terminal.

The movement pattern recognized by the user as being identical may even generate a slight difference according to psychological status of the user when each movement pattern is applied, such that the controller 180 may apply an approximation in determining the movement patterns. For example, the controller 180 may consider a relevant movement pattern as a pattern within a predetermined approximation from a recorded pattern.

The controller 180 may utilize one or more selected from displacement, velocity, acceleration, direction and rotational direction as parameters for interpreting the movement pattern. The parameter may be obtained from the detection values of the movement detection unit. The movement patterns recognized by the controller 180 may be classified according to reciprocation motion, circular motion, hitting or pushing as an instantaneous acceleration, turning (rotation) and/or complex pattern motions (i.e., '8' character motion, zigzag motion and the like).

A functional description and implementing methods of embodiments of the present invention may now be explained with respect to the elements in FIG. 1.

The output unit 150 of the portable terminal may include a vibration generation unit for vibrating the portable terminal. The manipulation unit 130 may include a touch screen as a receiving device for receiving a coordinate value on the display screen. That is, the manipulation unit 130 may receive input from a user and determine a coordinate value on a display screen.

The controller 180 may determine the vibration pattern corresponding to the coordinate value inputted from the receiving device on the screen on which an image frame is displayed and the currently-displayed image frame. The controller 180 may control the vibration generation unit for vibrating the portable terminal based on the determined vibration pattern.

Parameters for regulating mutually different vibration patterns by the controller 180 may use vibration frequency, amplitude (strength) and/or vibration interval and the like.

The vibration generation unit may include a vibrator for mechanically vibrating the portable terminal. The vibrator may be one of several products having an appropriate size and performance and suitable for use inside the portable terminal.

The vibrator may receive a simple turn-on electric potential as a driving power, or a clock type signal. The turn-on electric potential may reduce cost for implementation but may be problematic due to difficulty in transmitting complex information. The clock type signal may have difficulty in implementation and require costly parts but may have an advantage in that a number of vibration patterns generated by the vibration generation unit may be increased to enable transmission of complex information. The clock type signal may have another advantage in that clock frequency may be adjusted to control vibration frequency of the vibrator.

The vibration generation unit may include two or more vibrators. Two or more vibrators may make it possible to implement a variety of applications. For example, two or more vibrators each having a different intrinsic vibration frequency may allow a user to discern a response difference using the frequency difference, or two or more vibrators each having a different vibration direction and/or location may allow the user to discern the response difference using the vibration direction that is felt when the user holds the portable terminal and/or vibration location.

A predetermined area allocated to the memory 160 of the portable terminal may store data such as database for supporting the driving method of the portable terminal. For example, the memory 160 may store a pointing-vibration pattern database in which a first field may be allocated for information of kinds of screen frames in order to assist in determining vibration patterns by the controller 180 in response to an on-going condition, a second field may be allocated for information of pointed items, and a third field may be allocated for information of vibration patterns. The memory 160 and/or a main memory (not shown) of the portable terminal may temporarily store screen frames to be displayed for performing an operation.

FIG. 7 is a flowchart illustrating a driving method of a portable terminal for outputting vibration patterns relative to a predetermined pointed item on a screen frame of the portable terminal according to an example embodiment. Other operations, orders of operations and embodiments are also within the scope of the present invention.

As shown in FIG. 7, the driving method of the portable terminal may include determining (or receiving) a touched coordinate value of a touch screen (i.e., a receiving device) of the portable terminal in operation S120. The method may also include determining an area of the coordinate value on a screen frame in operation S140, determining a vibration pattern in operation S160 based on the determined area, and vibrating the portable terminal in operation S180 based on the determined vibration pattern.

Although the term 'touch' has been used above, the term 'touch' may be interpreted to include all pointing operations within a recognizable scope including the touch screen being located at a position near to a finger of the user (or a stylus). This may be considered a proximity touch. The operation S140 may determine an area and an item touched by the user. A separate data structure may be required that has displayed items corresponding to respective coordinate values relative to the objected image frame. A relation between the original screen frame data and an example arrangement of the separate data structural body is shown in FIGS. 8A and 8B. The image frames in FIG. 8A and FIG. 8B have a same coordinate value. As a result, each pixel of the image frames of FIG. 8B corresponds one-on-one to each pixel comprising the image frame of FIG. 8A. FIGS. 8A and 8B also illustrate a frame shape of the portable terminal.

FIG. 8A shows an area 11 displaying information about an antenna, an area 12 displaying information about an auxiliary memory, an area 13 displaying information about an alarm, an area 16 displaying information about a message, an area 14 displaying information about a battery and an area 15 displaying information about time. Other areas and/or information may also be provided.

Each point within the area 11 of an antenna may have a same color, such as blue, and each point within the area 14 corresponding to a battery may have a same color such as yellow. Other colors may also be used. In FIG. 8B, if the controller 180 determines a coordinate or position value corresponding to the touched area, the user may understand which item has been selected.

The database formed inside the memory 160 may be utilized for performing the operation S160. For example, operation S160 may search for a relevant vibration pattern by retrieving the database utilizing kinds of screen frames and pointed items.

The operations S120 to S160 may be performed by the controller 180 of the portable terminal in FIG. 1, and the operation S180 may be performed by the output unit 150 of the portable terminal provided with the vibration generation unit.

The vibration generation unit may be a vibrator for performing vibrations in response to a driving signal (potential or clock). The controller 180 may generate a driving signal relative to the vibrator corresponding to the determined vibration pattern. This may cause the vibration pattern in operation S180.

An intentional delay time may be provided between the touch operation-finish time and the vibration pattern output for convenience of vibration pattern recognition by the user. In other words, a delay time may be further provided between the operation S120 and the operation S140 or between the operation S160 and the operation S180.

FIG. 8A is a reception standby screen of a portable terminal according to an example embodiment. FIG. 8B is a drawing for mapping distinguishing detailed domains divided by pointing of an indicator on a reception screen. Other embodiments and configurations are also within the scope of the present invention.

The reception standby screen may include a bar-shaped indicator area. The indicator area may include information of items such as an antenna, a battery, an alarm and the like in a form of icons, for example.

For example, as shown in FIG. 9A, when a user touches or comes near the area 11 depicting an antenna using a finger or a stylus, the portable terminal may output a vibration pattern corresponding to reception sensitivity of the antenna. As is shown, a different vibration pattern may be provided for different reception sensitivities. Methods for indicating the reception sensitivity via a vibration pattern may include a variety of methods other than the ones shown in the figures.

As shown in FIG. 9B, when a user touches or comes near the area 14 depicting a battery using a finger or a stylus, the portable terminal may output a vibration pattern corresponding to a charged level of the battery. As is shown, a different vibration pattern may be provided for different charge levels.

As shown in FIGS. 10A and 10B, when a user touches or comes near the area 13 depicting an alarm bell using a finger or a stylus, the portable terminal may output a vibration pattern corresponding to an established alarm time. The portable terminal may output, via the vibration pattern, a state of whether an alarm has been set up, or a time remaining up to an established time. The vibration outputs relative to the times shown in FIGS. 10A and 10B may be applied as an output of the current time via the vibration pattern, when a graphic background of FIG. 10C includes a watch shape for indicating a time and the watch shape is touched.

When a user touches or comes near an area 16 depicting a message icon using a finger or a stylus, the portable terminal may output a vibration pattern corresponding to a state of a message inbox (i.e., a number of unread messages).

When a user touches or comes near an area 12 depicting an auxiliary memory using a finger or a stylus, the portable terminal may output a vibration pattern corresponding to remaining storable capacity of the auxiliary memory (such as a mini SD card).

The reception standby screen may be displayed with the day's date and a current time as shown in FIG. 10C. For example, when a time-indicating area on the reception standby screen is touched, the portable terminal may output, via the vibration pattern, a standard time (a world-widely known standard time), and/or information relative to the alarm time.

Furthermore, when a user touches or comes near a date-indicating area on the reception standby screen using a finger or a stylus, and the portable terminal stores information regarding a work load to be handled that day, the portable terminal may output, via vibration pattern, a kind of work and a number of work loads to be finished that day based on the stored information.

FIG. 11 illustrates a keypad display screen of a portable terminal having a touch screen according to an example embodiment. Other embodiments and configurations are also within the scope of the present invention.

When a keypad on the keypad display screen is touched, there is generated an effect of a relevant keypad having been pressed. However, aside from a direct touch operation, the portable terminal may recognize an approach on the touch screen of a finger or a stylus within a predetermined distance. This may be considered a proximity touch.

If each number key is designated with a shortcut key and a finger or a stylus approaches an area of one of the number keys 0 to 9, a vibration pattern may be outputted distinguishing a telephone number designated by the shortcut key or a telephone number of another person.

When a finger or a stylus approaches an area shown with a message confirmation key K1, a number of unread messages may be outputted in a form of a vibration pattern. For example, when a finger or a stylus approaches an area shown with the key K1, a vibration pattern distinguishing recently received telephone numbers or another person may be outputted. When a finger or a stylus approaches a SEND key, a vibration pattern may be outputted that identifies that a message was sent. When a finger or a stylus approaches an area shown with a cancellation key K3, a vibration pattern may be outputted that distinguishes whether there is a received call request during absence and/or received telephone numbers during recent absence.

FIG. 12 illustrates differently outputting a vibration pattern according to another terminal's situation when a user designates and presses a relevant telephone number of the user for a telephone call with a particular person.

When the other terminal or person is willing to receive a telephone call request, a vibration pattern, as illustrated in FIG. 12 (top), may be outputted to allow the user to recognize a communication connection even if the user holds the portable terminal away from his or her ear.

If the only ring tone is heard due to delay with communication with the other terminal, the situation is that the other terminal is absent and is unable to receive the call, or the other terminal refuses to receive the call. Corresponding vibration patterns may be output.

The portable terminal of the other person may be continuously called via a bell sound or a vibration, but the call may be finished by pressing of the end key or the portable terminal itself may be turned off.

The portable terminal may check the status of the portable terminal of the other person to output a vibration pattern corresponding to the situation (such as reception refused), and the situation may be notified to the user by the vibration pattern.

When a user prepares a message to designate a receiver, and presses the message send key K2, a different vibration pattern may be outputted according to reception status of the sent message.

When a message is sent from a portable terminal, the sent result may be a transmission failure of a portable terminal at a transmission end as shown in FIG. 13A, a reception failure of a portable terminal at a receiving end as shown in FIG. 13B, a transmission completion of a portable terminal at the transmission end as shown in FIG. 13C, and a reception completion of a portable terminal at the receiving end as shown in FIG. 13D. The portable terminal that has sent a message and/or the portable terminal that is to receive the message may be vibrated by a distinguishing vibration pattern.

FIG. 14 illustrates a message reception list screen of a portable terminal according to an example embodiment. Other embodiments and configurations are also within the scope of the present invention.

The message reception list screen includes a list displayed on the screen having information of whether a message has been read or not, whether response has been sent or not, a sender, part of the message content, etc.

For example, a vibration pattern may be output when a finger or a stylus touches a letter icon area indicating whether a message has been read or not and/or whether a response has been sent or not. Alternatively, an arrival date and/or time of the message may be outputted via a vibration pattern.

When a finger or a stylus touches a character area indicating a sender, a vibration pattern distinguishable of a group belonging to a relevant sender regulated by a vibration pattern distinguishing a relevant sender and/or a telephone directory may be outputted.

When a finger or a stylus touches a character area indicating part of the message content, a vibration pattern notifying a particular word/character row contained in the message content may be outputted. More specifically, if a user wishes to search for a message related to 'insurance', and if the word 'insurance' is provided in the character row that outputs the vibration pattern, a vibration pattern designated to 'insurance' may be recognized by tactile sensation when a character reading as 'insurance' is received by a relevant message whenever a user touches the area of each message.

FIG. 15 illustrates a moving image reproduction screen of a portable terminal having a touch screen according to an example embodiment. Other embodiments and configurations are also within the scope of the present invention.

As shown in FIG. 15, a multimedia content reproduction screen such as the moving image reproduction screen may be provided with an area M0 in which moving images are played, an area M2 that includes manipulation buttons such as a sound control, a rewinding, a fast winding, pause/reproduction, an area M1 indicating a reproduction time, and an area M5 that shows content subjects. When a finger or a stylus touches a character area indicating a sender, or approaches the relevant area, a vibration pattern according to the designated regulation may be outputted.

When a finger or a stylus touches the area M5 provided with a content title, kinds of contents may be outputted via vibration patterns. More specifically, a vibration pattern may be outputted indicating whether a content to be reproduced belongs to one of a music video, a movie, a preview of a movie, an advertisement and a moving image lecture, or a vibration pattern may be outputted indicating whether the content to be reproduced is an opened one, or whether the content to be reproduced is a content to be protected by a copyright. In addition, items to be outputted via a vibration pattern may be outputted or embodied when the finger or stylus touches an area played by the content.

When a finger or a stylus touches the area M4 provided with a speaker icon, a volume degree of content under reproduction may be outputted via a vibration pattern.

When a finger or a stylus approaches an area depicted with the manipulation button M2, a remaining reproduction time of content under reproduction may be outputted via the vibration pattern. When a finger or a stylus touches an area M3 depicted with a reproduction time or a process status bar, a remaining reproduction time of content under reproduction may be outputted via a vibration pattern.

When a finger or a stylus touches an area M0 from which the content is outputted, a sound output may be stopped and a vibration pattern in proportion to the outputted sound may be outputted instead. The output of the vibration pattern in proportion to the outputted sound in that the sound output may be interrupted to allow a user to continuously monitor content under reproduction. There may be no large difference in light of convenience sake when the area being touched for the above-mentioned function belongs to other area(s).

FIGS. 16A and 16B illustrate an instant messenger performance screen of a portable terminal having a touch screen according to an example embodiment. Other embodiments and configurations are also within the scope of the present invention.

The portable terminal may perform a messenger service. As shown in FIG. 16A, the screen may display an acquaintance list to be connected to the messenger after a messenger program is loaded with the portable terminal. A conversation window may also be displayed as shown in FIG. 16B. Even in FIGS. 16A and 16B, when a finger or a stylus touches or approaches a relevant area, a vibration pattern may be outputted according to the designated regulation.

When a finger or a stylus approaches an area in which names of other people are listed, a number of messenger conversations performed with a relevant opposite party on a same date, or a lapse time from a time in which a recent messenger conversation was completed may be outputted via a vibration pattern.

When a finger or a stylus approaches an area in which an icon of another person is provided as shown in FIG. 16B, another person's feeling (which is established by the other person as his or her messenger program) transmitted through the messenger program may be outputted via the vibration pattern. Alternatively, a lapse time from a time in which transmission/receipt of recent messages was completed via the messenger may be outputted via the vibration pattern.

FIG. 17 illustrates a display screen of a portable terminal during photographing according to an example embodiment. Other embodiments and configurations are also within the scope of the present invention.

Many items may be displayed on the screen in shapes of icons during photographing. For example, items or icons may be displayed in areas P1, P2, P3 and P7. Text may be displayed in areas P4, P5 and P6. When a finger or a stylus touches a relevant area, a vibration pattern may be outputted according to the designated regulation. For example, when a finger or a stylus touches the area P3 depicted a timer icon on the screen during the photographing, a standby time established in the timer may be outputted via the vibration pattern. When a finger or a stylus touches the area P1 depicted with a flash icon on the screen during the photographing, a standby time established for the flashlight emission and photographing may be outputted via the vibration pattern. Additionally, when a finger or a stylus touches a central area P0 on the screen that is to be utilized for focusing of an image to be photographed during the photographing, a focus distance to the touched portion may be outputted via vibration pattern.

FIG. 18 illustrates a display screen of a portable terminal after photographing according to an example embodiment. Other embodiments and configurations are also within the scope of the present invention.

Items may be displayed on the screen in shapes of icons after photographing. when a finger or a stylus touches a relevant area, a vibration pattern may be outputted according to the designated regulation. For example, when a finger or a stylus approaches an area on the screen shown with a storage menu after photographing, a capacity remaining on an auxiliary memory may be outputted via the vibration pattern. A capacity remaining in the auxiliary memory may be outputted via the vibration pattern in a same process relative to the corresponding menu items after voice recording is completed.

FIG. 19 illustrates a thumbnail relative to multimedia files of a portable terminal equipped with a touch screen, in which a camera album screen relative to photo files is illustrated according to an example embodiment. Other embodiments and configurations are also within the scope of the present invention.

When a finger or a stylus touches or approaches a particular unit image that includes a thumbnail, a file size (or other information related to image files such as resolution, image size, color quality) relative to the unit image file may be outputted via vibration pattern. Alternatively, a capacity remaining in a storage area in which the image files are stored in the above case may be outputted via vibration pattern.

FIG. 20 illustrates a screen that has loaded an internet browser on a portable terminal having a touch screen according to an example embodiment. Other embodiments and configurations are also within the scope of the present invention.

As shown in FIG. 20, a web browser screen may be displayed with an area b1 indicative of a title of the loaded web pages, a bookmark button area b2, a web page address input area b3, etc.

When a finger or a stylus touches or approaches a relevant area, a vibration pattern according to the designated regulation may be outputted. For example, when a finger or a stylus approaches the area b1 indicating the title of the web pages, a current connection status (i.e., online/offline, access speed) of the web pages may be outputted via the vibration pattern. When a finger or a stylus approaches the bookmark button area b2, a number of web pages registered as a bookmark may be outputted via the vibration pattern. Additionally, when a finger or a stylus approaches the area b3 indicating an address input window, a wireless data communication network status (i.e., data transmission speed) may be outputted via the vibration pattern.

FIGS. 21A and 21B illustrate applying a touch screen and a vibration pattern output to a Morse code input/output on a portable terminal having a touch screen according to an example embodiment. Other embodiments and configurations are also within the scope of the present invention.

As shown in FIG. 21A, when a user performs a touch in the form of Morse code on a touch screen, a corresponding text may be inputted. The text may be used in a format of a message to be sent or in a format of an e-book text file. As shown in FIG. 21B, when a message is received by a portable terminal, a Morse code corresponding to a text contained in the text to be received may be outputted via a vibration pattern.

FIGS. 22A and 22B illustrate a game execution screen and tables for a portable terminal having a touch screen according to an example embodiment. Other embodiments and configurations are also within the scope of the present invention.

As shown in FIG. 22A, an execution screen of online games may be displayed with a variety of characters, and when a finger or a stylus touches or approaches a relevant area in which each character is located, a vibration pattern may be outputted according to the designated regulation.

For example, when a finger or a stylus touches or approaches a relevant area in which a character is located, a vibration pattern according to the character, a vibration pattern according to feeling of the character and/or a vibration pattern according to status of the character may be outputted as shown in FIG. 22B.

FIGS. 23A and 23B illustrate a folder screen and a status screen on a portable terminal having a touch screen according to an example embodiment. Other embodiments and configurations are also within the scope of the present invention.

As shown in FIG. 23A, a folder screen may display icons of different folders (stored in the portable terminal). A user may select an icon, such as 'ebook', using a cursor CS1 (i.e., selected by a finger or a stylus) and then the status screen shown in FIG. 23B may be displayed. The user may then select one of the files or sub-folders of the selected folder using a cursor CS2 (i.e., selected by a finger or a stylus). When a finger or stylus touches or approaches the selected area (of the icon), a corresponding vibration pattern may be output. The output vibration pattern may indicate a state of the selected area. The output vibration pattern may represent an empty status, a full status and/or a status in between empty and full. Accordingly, different vibrations may be provided based on stored information of the files.

The term 'pattern' may represent a set of 'repeated shapes/designs' out of various glossarial definitions with regard to the pattern. The term 'shapes/designs' may not refer to shapes/designs in terms of visible meaning but rather to the shapes/designs of signal changes in particular parameters within a predetermined time interval.

Although the description relates to a touch screen as a receiving device for portable terminal, other receiving devices such as track ball and the like may be used. Also, the term 'touch' relative to the touch screen is one of 'pointing' or 'receiving' operations of a receiving device. The term 'touch' includes both a direct touch and a proximity touch.

A portable terminal may be wirelessly connected to an electronic computing device constituting a wireless communication network of a business providing a communication service. The portable terminal may be connected to an internet service providing server providing various internet services such as messengers and the like via the wireless communication network.

The portable terminal may be a mobile phone, a smart phone, a notebook computer, a digital broadcasting terminal, a Personal Digital Assistance (PDA), a Portable Multimedia Player (PMP) and a GPS navigation device and the like.

Embodiments may provide a portable terminal and driving method of the same mounted with interface means by way of pointing input and vibrated pattern output further enhanced in convenience between a user and the portable terminal.

A portable terminal and driving method of the same may be capable of providing convenience to a portable terminal-manipulating user with status information relative to the portable terminal.

A portable terminal may include a vibration generator for vibrating the portable terminal, a pointing device (or receiving device) for receiving a coordinate value on a display screen, and a controller for determining a vibration pattern corresponding to a current display screen and the coordinate value inputted by the pointing device (or receiving device) to control operation of the vibration generator.

The portable terminal may notify a user with user-wanted information in a vibration pattern according to a position pointed out by the user on a current display screen.

A driving method of the portable terminal may include (a) receiving a pointed coordinate value from a pointing device (or receiving device) of the portable terminal, (b) determining an area of the pointed coordinate value on a frame data of a screen at a pointing-performed time, (c) determining a vibration pattern as a result of the area determined by the inputted coordinate value, and (d) vibrating the portable terminal according to the determined vibration pattern.

As a result, the portable terminal may effectively notifying the user of various kinds of status information by way of frames of current screen and vibration pattern.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A portable terminal comprising:
a vibration generator for vibrating the portable terminal;
a receiving device for receiving a first input from a user and determining a coordinate value on a display screen based on the received first input; and a controller for determining that the coordinate value corresponds to information of a battery, the controller determining a first charge level of the battery based on the determined coordinate value, the controller determining a first vibration pattern that corresponds to the determined first charge level of the battery, and the controller to control vibrations of the vibration generator based on the determined first vibration pattern, wherein in response to the receiving device receiving a second input corresponding to the determined coordinate value, the controller determines a second charge level of the battery, the controller determines a second vibration pattern that corresponds to the determined second charge level of the battery, and the controller to control vibrations of the vibration generator based on the determined second vibration pattern.

2. The portable terminal of claim 1, wherein the information comprises an image on the display screen.

3. The portable terminal of claim 1, wherein the information comprises an object on the display screen.

4. The portable terminal of claim 1, wherein the information comprises a number or a graphic on the display screen.

5. The portable terminal of claim 1, further comprising a memory having a pointing-vibration pattern database in which a first field corresponds to information of screen frame types, a second field corresponds to information of objects, and a third field corresponds to information of vibration patterns.

6. The portable terminal of claim 1, further comprising a memory for storing frame data of the display screen.

7. The portable terminal of claim 1, wherein the controller determines a vibration pattern corresponding to a remaining time during multimedia file reproduction when a subsequently determined coordinate value corresponds to an area on the display screen displaying the multimedia file reproduction.

8. The portable terminal of claim 1, wherein the controller determines a vibration pattern corresponding to image capture set-up information of the camera when a subsequently determined coordinate value corresponds to a camera icon area on the display screen.

9. The portable terminal of claim 1, wherein the controller determines a vibration pattern corresponding to status of the game character when a subsequently determined coordinate value corresponds to a game character area on a game screen of the display screen.

10. The portable terminal of claim 1, wherein the controller converts the determined coordinate value to a code of a predetermined regulation.

11. The portable terminal of claim 1, wherein the controller determines the first vibration pattern corresponding to the first charge level of the battery when the determined coordinate value corresponds to a battery icon area on the display screen.

12. The portable terminal of claim 1, wherein the controller determines a vibration pattern corresponding to whether an alarm has been set up or not when a determined coordinate value corresponds to an alarm icon area on the display screen.

13. The portable terminal of claim 1, wherein the controller determines a vibration pattern corresponding to a status of a message inbox when a determined coordinate value corresponds to a message icon area on the display screen.

14. The portable terminal of claim 1, wherein the controller determines a vibration pattern corresponding to a remaining capacity of the memory of the portable terminal when a determined coordinate value corresponds to a memory icon area on the display screen.

15. The portable terminal of claim 1, wherein the controller determines a vibration pattern corresponding to a feeling of another person when a determined coordinate value corresponds to a display area of the another person on a messenger execution screen of the display screen.

16. The portable terminal of claim 1, wherein the controller determines a vibration pattern corresponds to status of a specific folder when a determined coordinate value corresponds to information of the specific folder on the display screen.

17. The portable terminal of claim 1, wherein the received input is a direct touch of a touch screen by a user or a stylus.

18. The portable terminal of claim 1, wherein the received first input is a proximity touch of a touch screen by a user or a stylus.

19. A driving method of a portable terminal comprising:
receiving a first input from a user;
determining a coordinate value of a display screen based on the first input from the user;
determining that the determined coordinate value corresponds to information of a battery;
determining a first charge level of the battery based on the determined coordinate value;
determining a first vibration pattern that corresponds to the determined first charge level of the battery;
vibrating the portable terminal based on the determined first vibration pattern;
receiving a second input corresponding to the determined coordinate value;
determining a second charge level of the battery based on the received second input that corresponds to the determined coordinate value;
determining a second vibration pattern that corresponds to the determined second charge level of the battery; and
vibrating the portable terminal based on the determined second vibration pattern.

20. The method of claim 19, wherein the information comprises an image or an object on the display screen.

21. The method of claim 19, wherein the information comprises a number or a graphic on the display screen.

22. The method of claim 19, wherein determining the vibration pattern utilizes a pointing-vibration database in which a first field corresponds to information of screen frame types, a second field corresponds to information of items, and a third field corresponds to information of vibration patterns.

23. The method of claim 19, further comprising determining a vibration pattern corresponding to a remaining time during multimedia file reproduction when a determined coordinate value corresponds to a multimedia file reproduction area on the display screen.

24. The method of claim 19, further comprising determining a vibration pattern corresponding to image capture set-up information of the camera when a determined coordinate value corresponds to a camera icon area on the display screen.

25. The method of claim 19, further comprising determining a vibration pattern corresponding to status of a game character when a determined coordinate value corresponds to a game character area on a game screen of the display screen.

26. The method of claim 19, wherein determining the first vibration pattern includes converting coordinate values from a receiving device to a code of a predetermined regulation.

27. The method of claim 19, wherein determining the vibration pattern includes determining the first vibration pattern corresponding to the first charge level of the battery when the determined coordinate value corresponds to a battery icon area on the display screen.

28. The method of claim 19, further comprising determining a vibration pattern corresponding to whether an alarm has been set up or not when a determined coordinate value corresponds to an alaim icon area on the display screen.

29. The method of claim 19, further comprising includes determining a vibration pattern corresponding to a status of a message inbox when a determined coordinate value corresponds to a message icon area on the display screen.

30. The method of claim 19, further comprising determining a vibration pattern corresponding to a remaining capacity of a memory of the portable terminal when a determined coordinate value corresponds to a memory icon area on the display screen.

31. The method of claim 19, further comprising determining a vibration pattern corresponding to a feeling of another person when a determined coordinate value corresponds to a display area of another person on a messenger execution screen of the display screen.

32. The method of claim 19, further comprising determining a vibration pattern corresponds to status of a specific folder when a determined coordinate value corresponds to information of the specific folder on the display screen.

33. The method of claim 19, wherein receiving the first input comprises receiving an input from either a direct touch or a proximity touch of a touch screen.

34. A driving method of a portable terminal comprising:
receiving a first input from a user;
determining a coordinate value of a display screen based on the first input from the user;
determining that the determined coordinate value corresponds to information of an antenna;
determining a first reception sensitivity of the antenna based on the determined coordinate value;
determining a first vibration pattern that corresponds to the determined first reception sensitivity of the antenna; and
vibrating the portable terminal based on the determined first vibration pattern;
receiving a second input corresponding to the determined coordinate value;
determining a second reception sensitivity of the antenna based on the received second input that corresponds to the determined coordinate value;
determining a second vibration pattern that corresponds to the determined second reception sensitivity of the antenna; and
vibrating the portable terminal based on the determined second vibration pattern.

35. The method of claim 34, wherein determining the vibration pattern includes determining the first vibration pattern corresponding to the reception sensitivity of the antenna when the determined coordinate value corresponds to an antenna icon area on the display screen.

36. A portable terminal comprising:
a vibration generator for vibrating the portable terminal;
a receiving device for receiving a first input from a user and determining a coordinate value on a display screen based on the received first input; and
a controller for determining that the coordinate value corresponds to information of an antenna, the controller determining a first reception sensitivity of the antenna, the controller determining a first vibration pattern that corresponds to the determined first reception sensitivity of the antenna, and the controller to control vibrations of the vibration generator based on the determined first vibration pattern,
wherein in response to the receiving device receiving a second input corresponding to the determined coordinate value, the controller determines a second reception sensitivity of the antenna, the controller determines a second vibration pattern that corresponds to the determined second reception sensitivity of the antenna, and the controller to control vibrations of the vibration generator based on the determined second vibration pattern.

37. The portable terminal of claim 36, wherein the controller determines the first vibration pattern corresponding to the first reception sensitivity of the antenna when the determined coordinate value corresponds to an antenna icon area on the display screen.

* * * * *